United States Patent
Cortos et al.

(10) Patent No.: US 7,962,634 B2
(45) Date of Patent: Jun. 14, 2011

(54) SUBMISSION OF METADATA CONTENT AND MEDIA CONTENT TO A MEDIA DISTRIBUTION SYSTEM

(75) Inventors: Ricardo Cortos, Los Gatos, CA (US); Max Muller, San Jose, CA (US)

(73) Assignee: Apple Inc., Cupertino, CA (US)

( * ) Notice: Subject to any disclaimer, the term of this patent is extended or adjusted under 35 U.S.C. 154(b) by 474 days.

(21) Appl. No.: 11/712,304

(22) Filed: Feb. 27, 2007

(65) Prior Publication Data

US 2007/0266047 A1 Nov. 15, 2007

Related U.S. Application Data

(60) Provisional application No. 60/800,843, filed on May 15, 2006.

(51) Int. Cl.
 G06F 15/16 (2006.01)
 G06F 17/00 (2006.01)
 G06F 21/00 (2006.01)

(52) U.S. Cl. ............................ 709/229; 707/687; 705/51

(58) Field of Classification Search ............... 707/104.1, 707/8; 705/50–59
See application file for complete search history.

(56) References Cited

U.S. PATENT DOCUMENTS

| | | | |
|---|---|---|---|
| 5,752,128 A | 5/1998 | Yamashita | |
| 5,884,280 A | 3/1999 | Yoshioka et al. | |
| 5,926,624 A | 7/1999 | Katz et al. | |
| 6,085,253 A | 7/2000 | Blackwell et al. | |
| 6,226,618 B1 | 5/2001 | Downs et al. | |
| 6,263,313 B1 * | 7/2001 | Milsted et al. | 705/1 |
| 6,338,044 B1 | 1/2002 | Cook et al. | |
| 6,345,256 B1 | 2/2002 | Milsted et al. | |
| 6,363,486 B1 | 3/2002 | Knapton | |
| 6,385,596 B1 | 5/2002 | Wiser et al. | |
| 6,546,555 B1 * | 4/2003 | Hjelsvold et al. | 725/1 |
| 6,549,922 B1 | 4/2003 | Srivastava et al. | |
| 6,691,149 B1 | 2/2004 | Yokota et al. | |
| 6,731,312 B2 | 5/2004 | Robbin | |
| 6,873,992 B1 | 3/2005 | Thomas | |
| 6,874,003 B2 | 3/2005 | Morohashi | |
| 6,910,049 B2 * | 6/2005 | Fenton et al. | 707/104.1 |
| 7,073,193 B2 * | 7/2006 | Marsh | 725/114 |
| 7,076,445 B1 | 7/2006 | Cartwright | |
| 7,209,892 B1 | 4/2007 | Galuten et al. | |
| 7,383,233 B1 | 6/2008 | Singh et al. | |
| 7,729,946 B2 | 6/2010 | Chu | |

(Continued)

FOREIGN PATENT DOCUMENTS

EP 1 684 223 A1 7/2006

(Continued)

OTHER PUBLICATIONS

"Liquifier Pro 4.0 for Windows™ User's Guide," 1998, Liquid Audio, Inc.

(Continued)

*Primary Examiner* — Rupal D Dharia
*Assistant Examiner* — Robert Shaw

(57) ABSTRACT

The disclosed embodiments relate generally to the submission of metadata content and media content to a media distribution system. The media content can include, for example, audio, video, image, or podcast data. In accordance with one embodiment, a client submitting metadata content can validate the metadata content prior to submission of the metadata content and/or associated media content. A media distribution system receiving metadata content can also validate the metadata content.

19 Claims, 14 Drawing Sheets

U.S. PATENT DOCUMENTS

| | | | |
|---|---|---|---|
| 7,827,162 | B2 | 11/2010 | Suitts et al. |
| 7,844,548 | B2 | 11/2010 | Robbin et al. |
| 2001/0021926 | A1* | 9/2001 | Schneck et al. ............... 705/54 |
| 2001/0044786 | A1 | 11/2001 | Ishibashi |
| 2001/0054046 | A1 | 12/2001 | Mikhailov et al. |
| 2002/0002541 | A1* | 1/2002 | Williams ...................... 705/51 |
| 2002/0032658 | A1 | 3/2002 | Oki et al. |
| 2002/0049844 | A1 | 4/2002 | Nishikawa |
| 2002/0073177 | A1* | 6/2002 | Clark et al. .................. 709/219 |
| 2002/0082857 | A1 | 6/2002 | Skordin et al. |
| 2002/0099661 | A1 | 7/2002 | Kii et al. |
| 2002/0099696 | A1 | 7/2002 | Prince |
| 2002/0099801 | A1 | 7/2002 | Ishii |
| 2002/0107803 | A1* | 8/2002 | Lisanke et al. ................ 705/51 |
| 2002/0112171 | A1 | 8/2002 | Ginter et al. |
| 2002/0116293 | A1* | 8/2002 | Lao et al. ..................... 705/27 |
| 2002/0124182 | A1* | 9/2002 | Bacso et al. .................. 713/200 |
| 2002/0152267 | A1 | 10/2002 | Lennon |
| 2002/0152278 | A1* | 10/2002 | Pontenzone et al. ......... 709/217 |
| 2002/0165811 | A1 | 11/2002 | Ishii et al. |
| 2002/0186844 | A1 | 12/2002 | Levy et al. |
| 2002/0198843 | A1 | 12/2002 | Wang et al. |
| 2003/0005173 | A1* | 1/2003 | Shah et al. ................... 709/318 |
| 2003/0037242 | A1 | 2/2003 | Yasuna et al. |
| 2003/0065717 | A1 | 4/2003 | Saito et al. |
| 2003/0074465 | A1 | 4/2003 | Tang et al. |
| 2003/0115144 | A1 | 6/2003 | Stefik et al. |
| 2003/0120593 | A1* | 6/2003 | Bansal et al. ................ 705/39 |
| 2003/0120928 | A1* | 6/2003 | Cato et al. ................... 713/176 |
| 2003/0135424 | A1 | 7/2003 | Davis et al. |
| 2003/0149742 | A1* | 8/2003 | Bollerud ....................... 709/217 |
| 2004/0012618 | A1 | 1/2004 | Finney |
| 2004/0015427 | A1 | 1/2004 | Camelio |
| 2004/0015445 | A1 | 1/2004 | Heaven |
| 2004/0034601 | A1 | 2/2004 | Kreuzer |
| 2004/0044949 | A1 | 3/2004 | Rowe |
| 2004/0059929 | A1* | 3/2004 | Rodgers et al. .............. 713/193 |
| 2004/0133605 | A1* | 7/2004 | Chang et al. ................. 707/104.1 |
| 2004/0136698 | A1* | 7/2004 | Mock ........................... 386/123 |
| 2004/0153968 | A1 | 8/2004 | Ching et al. |
| 2004/0167858 | A1 | 8/2004 | Erickson |
| 2004/0205028 | A1 | 10/2004 | Verosub et al. |
| 2004/0215733 | A1* | 10/2004 | Gondhalekar et al. ........ 709/207 |
| 2004/0254883 | A1 | 12/2004 | Kondrk et al. |
| 2004/0254949 | A1* | 12/2004 | Amirthalingam ............. 707/101 |
| 2004/0267552 | A1 | 12/2004 | Gilliam et al. |
| 2004/0268451 | A1 | 12/2004 | Robbin et al. |
| 2005/0015765 | A1 | 1/2005 | Covell et al. |
| 2005/0021478 | A1 | 1/2005 | Gautier et al. |
| 2005/0034164 | A1 | 2/2005 | Sano et al. |
| 2005/0038813 | A1* | 2/2005 | Apparao et al. ............. 707/104.1 |
| 2005/0050218 | A1 | 3/2005 | Sheldon et al. |
| 2005/0050345 | A1 | 3/2005 | Dowdy et al. |
| 2005/0144635 | A1 | 6/2005 | Boortz |
| 2005/0182792 | A1 | 8/2005 | Israel et al. |
| 2005/0216472 | A1* | 9/2005 | Leon et al. .................... 707/10 |
| 2005/0240529 | A1 | 10/2005 | Thomas |
| 2005/0267894 | A1 | 12/2005 | Camahan |
| 2005/0278375 | A1* | 12/2005 | Mitchko et al. ............. 707/104.1 |
| 2006/0015489 | A1* | 1/2006 | Probst et al. ................. 707/3 |
| 2006/0041748 | A1* | 2/2006 | Lockhart et al. ............. 713/168 |
| 2006/0048132 | A1 | 3/2006 | Chen et al. |
| 2006/0074754 | A1 | 4/2006 | Toyohara et al. |
| 2006/0107046 | A1 | 5/2006 | Raley et al. |
| 2006/0112101 | A1 | 5/2006 | Young |
| 2006/0161604 | A1* | 7/2006 | Lobo ............................ 707/203 |
| 2006/0212722 | A1 | 9/2006 | Ginter et al. |
| 2006/0277096 | A1 | 12/2006 | Levitus |
| 2006/0287966 | A1 | 12/2006 | Srinivasaraghavan et al. |
| 2007/0011156 | A1* | 1/2007 | Maron ......................... 707/6 |
| 2007/0073694 | A1* | 3/2007 | Picault et al. ................ 707/9 |
| 2007/0083471 | A1 | 4/2007 | Robbin et al. |
| 2007/0106522 | A1* | 5/2007 | Collins ........................ 705/1 |
| 2007/0108247 | A1 | 5/2007 | Bardes |
| 2007/0192352 | A1 | 8/2007 | Levy |
| 2007/0220051 | A1* | 9/2007 | Brentano et al. ............ 707/104.1 |
| 2007/0261088 | A1* | 11/2007 | Phillips et al. ............... 725/97 |
| 2007/0265969 | A1 | 11/2007 | Horwat et al. |
| 2007/0266028 | A1 | 11/2007 | Muller et al. |
| 2008/0040379 | A1 | 2/2008 | Suitts et al. |
| 2009/0260060 | A1 | 10/2009 | Smith et al. |
| 2009/0276332 | A1 | 11/2009 | Gharabally et al. |
| 2009/0276333 | A1 | 11/2009 | Cortes et al. |
| 2009/0276433 | A1 | 11/2009 | Fosback et al. |
| 2009/0307201 | A1 | 12/2009 | Dunning et al. |
| 2009/0307682 | A1 | 12/2009 | Gharabally |
| 2009/0307683 | A1 | 12/2009 | Gharabally |
| 2010/0205274 | A1 | 8/2010 | Gharabally et al. |
| 2010/0235254 | A1 | 9/2010 | Chu et al. |
| 2010/0235889 | A1 | 9/2010 | Chu et al. |
| 2010/0299219 | A1 | 11/2010 | Cortes et al. |

FOREIGN PATENT DOCUMENTS

| | | |
|---|---|---|
| WO | WO 00/08909 | 2/2000 |
| WO | WO 02/48920 | 6/2002 |
| WO | WO 2004/019182 A2 | 3/2004 |

OTHER PUBLICATIONS

Radified Guide to Ripping & Encoding CD Audio, http://mp3.radified.com, downloaded Oct. 7, 2003, pp. 1-5.

"Music Collector Features," Collectorz.com music collector features, http://www.collectorz.com/music/features.php, downloaded Oct. 7, 2003, pp. 1-2.

"Gracenote CDDB," Gracenote, product webpage, http://www.gracenote.com/gn_products/cddb/html, downloaded Oct. 7, 2003, pp. 1-2.

"Gracenote MusicID," Gracenote, product webpage, http://www.gracenote.com/gn_products/music_id.html, downloaded Oct. 7, 2003, pp. 1-2.

"AVCataloger Overview," NC Software, Inc., http://www.avcataloger.com/Products.aspx, downloaded Oct. 6, 2003, pp. 1-4.

Jyri Huopaniemi, "Music Encoding and Transmission," CUIDAD meeting, ICMC 2000 Berlin, Aug. 28, 2000.

"Media Encoding FAQ," Loudeye Corp., http://www.loudeye.com/digitalmedia/solutions/mediaenchost/enclodingfaq.asp, downloaded Oct. 9, 2003, pp. 1-3.

"Media encoding datasheet," Loudeye Corp., http://www.loudeye.com/digitalmedia/solutions/mediaenchost/encloding.asp, downloaded Oct. 9, 2003, pp. 1-4.

"Media hosting datasheet," Loudeye Corp., http://www.loudeye.com/digitalmedia/solutions/mediaenchost/hosting.asp, downloaded Oct. 9, 2003, pp. 1-2.

"Preview and Convera Announce availability of Digital Media Commerce Platform for Secure Digital Audio Devices," Convera press release, Las Vegas, NV, Consumer Electronics Show, Jan. 8, 2001, pp. 1-3.

MPEG-7 Multimedia Description Schemes XM (Version 2.0), ISO/IEC, Mar. 2000, pp. 1-138.

U.S. Appl. No. 11/786,031 entitled Media Package Formate for Submission to a Media Distribution System, filed Apr. 9, 2007.

U.S. Appl. No. 11/946,711 entitled "Resubmission of Media for Network-Based Distribution", filed Nov. 28, 2007.

Office Action for U.S. Appl. No. 11/712,303 mailed May 13, 2009.

"Liquifier Pro 4.0 for Windows™ User's Guide," 1998, Liquid Audio, Inc.

Radified Guide to Ripping & Encoding CD Audio, http://mp3.radified.com, downloaded Oct. 7, 2003, pp. 1-5.

"Music Collector Features," Collectorz.com music collector features, http://www.collectorz.com/music/features.php, downloaded Oct. 7, 2003, pp. 1-2.

"Gracenote CDDB," Gracenote, product webpage, http://www.gracenote.com/gn_products/cddb/html, downloaded Oct. 7, 2003, pp. 1-2.

"Gracenote MusicID," Gracenote, product webpage, http://www.gracenote.com/gn_products/music_id.html, downloaded Oct. 7, 2003, pp. 1-2.

"AVCataloger Overview," NC Software, Inc., http://www.avcataloger.com/Products.aspx, downloaded Oct. 6, 2003, pp. 1-4.

Jyri Huopaniemi, "Music Encoding and Transmission," CUIDAD meeting, ICMC 2000 Berlin, Aug. 28, 2000.

"Media Encoding FAQ," Loudeye Corp., http://www.loudeye.com/digitalmedia/solutions/mediaenchost/encloding.asp. downloaded Oct. 9, 2003, pp. 1-2.

"Media encoding datasheet," Loudeye Corp., http://www.loudeye.com/digitalmedia/solutions/mediaenchost/encloding.asp, downloaded Oct. 9, 2003, pp. 1-4.

"Media hosting datasheet," Loudeye Corp., http://www.loudeye.com/digitalmedia/solutions/mediaenchost/hosting.asp, downloaded Oct. 9, 2003, pp. 1-2.

"Preview and Convera Announce availability of Digital Media Commerce Platform for Secure Digital Audio Devices," Convera press release, Las Vegas, NV, Consumer Electronics Show, Jan. 8, 2001, pp. 1-3.

Sonopress Global Network User Manual, Client Tools, Upload Data/Graphics Files to Sonopress, Sonopress, data unknown.

MPEG-7 Multimedia Description Schemes XM (Version 2.0), ISO/IEC, Mar. 2000, pp. 1-138.

Advisory Action for U.S. Appl. No. 11/712,303, mailed Feb. 16, 2011.

Final Office Action for U.S. Appl. No. 11/712,303, mailed Oct. 14, 2010.

Office Action for U.S. Appl. No. 11/712,303, mailed Jun. 9, 2010.

Advisory Action for U.S. Appl. No. 11/712,303, mailed Apr. 12, 2010.

Final Office Action for U.S. Appl. No. 11/712,303, mailed Jan. 22, 2010.

Notice of Allowance for U.S. Appl. No. 11/712,303, mailed Feb. 25, 2011.

* cited by examiner

| |
|---|
| Processing Instruction 602 |
| Package Container Version 604 |
| Provider 606 |
| Video 608 |
| Video type 610 |
| Network name 612 |
| Vendor Identifier 614 |
| Episode Production Number 616 |
| Series Name 618 |
| Title 620 |
| Container ID 622 |
| Container Position 624 |
| Release Date 626 |
| Original Release Year 628 |
| Genres 630 |
| Rating 632 |
| Advisory 634 |
| Copyright 636 |
| Short Description 638 |
| Long Description 640 |
| |
| Data File 642 |
| File Name 644 |
| File Size 646 |
| Checksum 648 |
| |
| Preview Start Time 650 |
| Vendor Offer Code 652 |
| Product 654 |
| Territory 656 |
| Sales Start Date 658 |
| Sales End Date 660 |
| Cleared For Sale 662 |

*FIG. 6*

| |
|---|
| Processing Instruction 702 |
| Package Container 704 |
| Provider 706 |
| Video 708 |
| Video type 710 |
| Production Company 712 |
| Vendor Identifier 714 |
| ISAN Identifier 716 |
| UPC 718 |
| All Movie Guide Video ID 720 |
| Title 722 |
| Original Release Year 724 |
| Country of Origin 726 |
| Genres 728 |
| Rating 730 |
| Copyright 732 |
| Cast 734 |
| Crew 736 |
| Synopsis 738 |
| Asset Description 740 |
| Asset Data File Name 742 |
| Asset File Size 744 |
| Asset Data File Checksum 746 |
| Poster Image File Name 748 |
| Poster Image Checksum 750 |
| |
| Bonus Material 752 |
| Vendor Identifier 754 |
| Name 756 |
| Copyright 758 |
| Volume 760 |
| Track 762 |
| Pre-order Only 764 |
| Bonus file name 766 |
| |
| Product 768 |
| Territory 770 |
| Wholesale Price Tier 772 |
| Pre-order Sales Start Date 774 |
| Sales Start Date 776 |
| Sales End Date 778 |
| Cleared For Sale 780 |

*FIG. 7A*

| Chapters version 782 |
|---|
| Chapter start time 784 |
| Chapter title 786 |
| Chapter picture filename 788 |

*FIG. 7B*

TV Metadata XML Example

Below is an example metadata.xml for an episode of the NBC series "The Office." You can view the product in the iTunes Music Store at this URL:
http://phobos.apple.com/WebObjects/MZStore.woa/wa/viewVideo?id=129396399&p=10280207&s=143441

*Please note:* the available product in the iTunes Music Store does not contain the ratings and advisories used in this example.

```
<?xml version = "1.0" encoding = "UTF-8"?>                  ~ 802
    <package version = "tv2.0">  ~ 804
        <provider>NBCUniversal</provider>  ~ 806
        <video>  ~ 808
            <types>tv</type>  ~ 810
            <network_name>NBC</network_name>  ~ 812
            <vendor_id>NBC_OFFICE_R2518</vendor_id>  ~ 814
            <episode_production_number>R2518</episode_production_number>  ~ 816
            <series_name> The Office</series_name>  ~ 818
            <title>Take Your Daughter to Work Day</title>  ~ 820
            <container_id>NBC_OFFICE_SEASON_002</container_id>  ~ 822
            <container_position>18</container_position>  ~ 824
            <release_date>2006-03-11</release_date>  ~ 826
            <original_release_year>2006</original_release_year>  ~ 828
            <genres>  ~ 830
                <genres>TVShows</genre>  ~ 832
            </genres>  ~ 834
            <ratings>  ~ 836
                <rating system="us-tv">TV-14</rating>  ~ 838
                <advisory system="us-cable">AL</advisory>  ~ 840
            </ratings>  ~ 842
            <copyright_cline>2005 NBC Universal</copyright_cline>  ~ 844
            <short_description>A routine office day is upended when children descend
upon Dunder Mifflin for Take Your Daughter to Work Day.</short_description>  ~ 846
            <long_description>A routine office day is upended when children descend
upon Dunder Mifflin for Take Your Daughter to Work Day. Michael (Golden
Globe winner Steve Carell) is surprised when he strikes up a friendship with the
five-year old daughter of his sworn enemy, Toby (Paul Lieberstein). Jenna
Fischer, John Krasinski, B.J. Novak, Rainn Wilson, Leslie David Baker, Brian
Baumgartner, kate Flannery, Angela Kinsey, Oscar Nunez and Phyllis Smith also
star.</long_description>  ~ 848
            <data_file>  ~ 850
                <file_name>officeR2518.mpg</file_name>  ~ 852
                <size>2595225600</size>  ~ 854           856
                <checksum type="md5">2a793a8b46037fe48a29dd739b49911a</checksum>
            </data_file>  ~ 858
            <preview starttime="60"/>  ~ 860
            <vendor_offer_code>OF9921</vendor_offer_code>  ~ 862
            <products>  ~ 864
                <product>  ~ 866
                    <territory>US</territory>  ~ 868
                    <sales_start_date>2006-03-12</sales_start_date>  ~ 870
                    <sales_end_date></sales_end_date>  ~ 872
                    <cleared_for_sale>true</cleared_for_sale>  ~ 874
                </product>  ~ 876
            </products>  ~ 878
        </video>  ~ 808
    </package>
```

FIG. 8

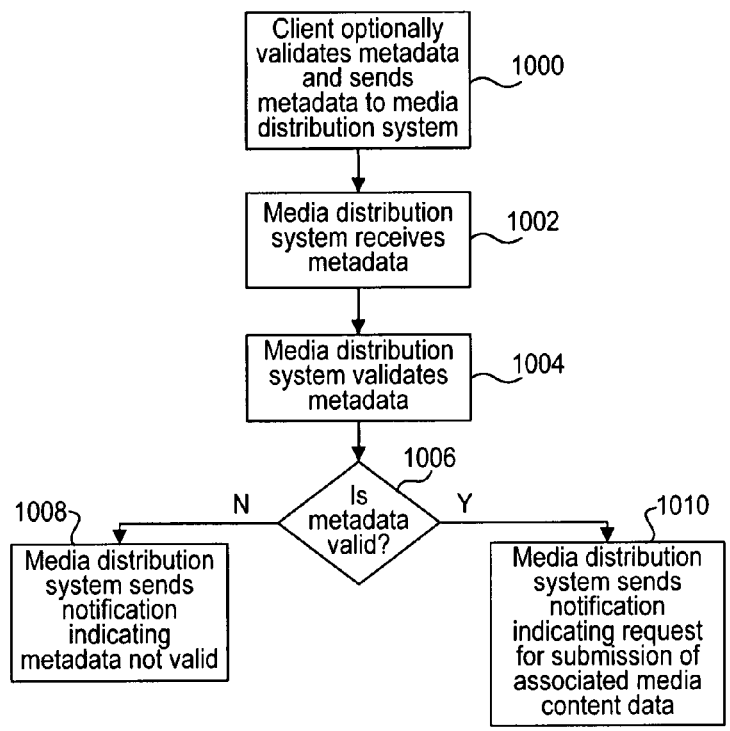
FIG. 10A
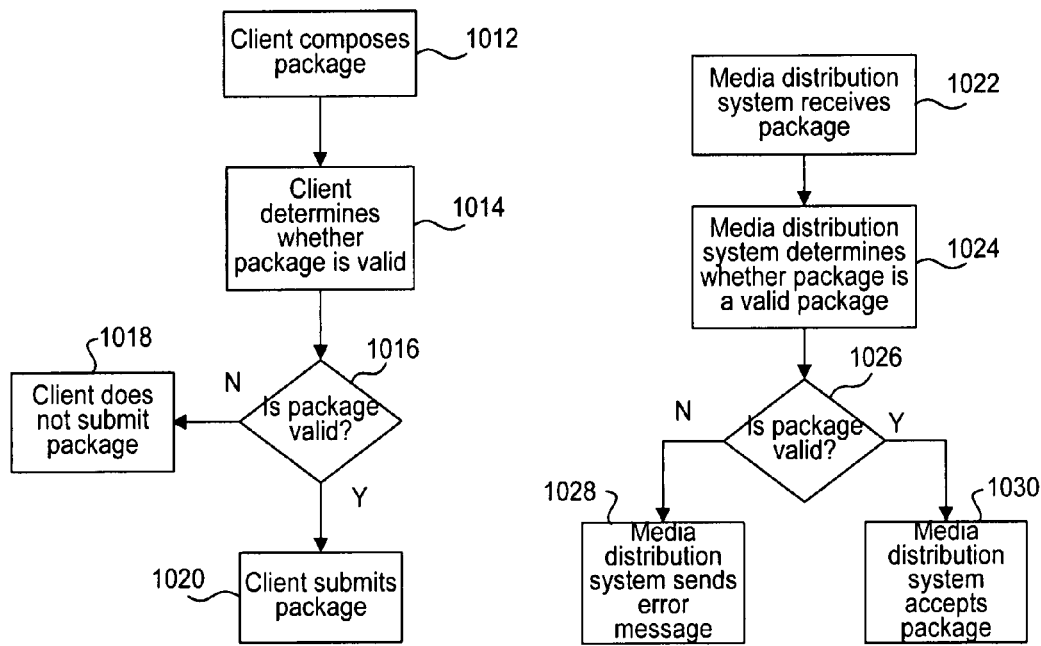
FIG. 10B  FIG. 10C

SUBMISSION OF METADATA CONTENT AND MEDIA CONTENT TO A MEDIA DISTRIBUTION SYSTEM

RELATED APPLICATIONS

This application claims priority from Patent Application No. 60/800,843, entitled "TECHNIQUES AND SYSTEMS FOR ELECTRONIC SUBMISSION OF MEDIA CONTENT," by Muller et al, filed on May 15, 2006, which is incorporated herein by reference for all purposes.

This application is also related to patent application Ser. No. 11/712,303, entitled "PROCESSING OF METADATA CONTENT AND MEDIA CONTENT RECEIVED BY A MEDIA DISTRIBUTION SYSTEM," by Muller et al, filed Feb. 27, 2007, which is incorporated herein by reference for all purposes.

BACKGROUND OF THE INVENTION

1. Field of the Invention

The present invention relates to media asset management, and more particularly, to submission of media assets to a distribution system in a client-server environment.

2. Description of the Related Art

Digital media service providers distribute media content products to users. For example, a digital media service provider may make media content products available for rental, purchase, and/or free distribution. The digital media service provider is often able to fulfill a request for a user desired media content product by handling digital rights management of the desired media content product, an associated billing transaction, if any, and delivery of the desired media content product to the user. Often, media content providers, such as recording labels/distributors, movie studios/distributors, and media content creators, provide the media content to a third party digital media service provider by providing one or more files to the digital media service provider. Traditionally, for a single media content product, a single file containing the playable content (e.g., a feature film) of the media content product is provided to the digital media service provider. However, under this approach, any modification to a single component of the media content product (e.g., addition, deletion, or replacement of an alternate audio track) requires the media content provider to produce again the single media content file by incorporating the modification and uploading again the entire single media content file (containing even the unmodified components) to the digital media service provider.

In view of the above, there exists a need for a way to more flexibly manage media content provided to a digital media service provider.

SUMMARY OF THE INVENTION

The disclosed embodiments relate generally to the submission of metadata and/or media content to a media submission and distribution system, the validation of the metadata, and the generation of media items from the media content. The media items may include, for example, audio, video, image, or podcast data, which may include movies and television episodes.

In accordance with one embodiment, a content provider submits metadata content to a media content distribution system, the metadata content identifying a plurality of data files including media content. The content provider can determine whether the metadata content is valid prior to submitting the metadata content to the media content distribution system. Thus, the metadata content can be submitted when it is determined by the content provider that the metadata content is valid.

In accordance with another embodiment, a media distribution system can validate metadata content that it receives from the content provider. More particularly, a media distribution system receives metadata content from a content provider, where the metadata content identifies a plurality of data files, each of the plurality of data files including media content. The metadata content can then be validated. The media distribution system can then send a notification to the content provider indicating whether the metadata content is valid. Accordingly, it is possible for the content provider and/or the media distribution system to validate the metadata.

In one embodiment, if that the metadata content is valid, the content provider can submit the corresponding media content. The media content can be submitted independently, or in combination with the metadata content.

In accordance with another embodiment, the media content can be submitted along with the metadata content in the form of a package. More particularly, a package including one or more metadata files and a plurality of data files can be generated, where each of the plurality of data files includes media content and the metadata files include metadata content. The package can then be submitted to a media content distribution system, thereby enabling a digital media file to be encoded using at least a portion of the media content in the plurality of data files according to the metadata content. It can be determined whether the package is a valid package prior to submitting the package. Thus, the package can be submitted when it is determined by the content provider that the package is a valid package. Validation can include validating the metadata content and/or media content.

In accordance with another embodiment, a user interface enables a client submitting a package to submit input associated with package submission. More particularly, a package including one or more metadata files and a plurality of data files is obtained, each of the plurality of data files including media content and the metadata files including metadata content. In addition, input (e.g., a command) is received from the client. The package is submitted to a media content distribution system, thereby enabling a digital media file to be encoded using at least a portion of the media content in the plurality of data files according to the metadata content. The input (e.g., command) can request or provide information associated with the package submission. Alternatively, the input (e.g., command) can indicate processing to be performed on the package prior to or subsequent to its submission.

In accordance with yet another embodiment, the media distribution system can validate a package that it has received from a content provider. More particularly, the media distribution system receives a package including metadata content from a content provider, the metadata content identifying a plurality of data files, each of the plurality of data files including media content. The media distribution system can determine whether the package is a valid package. The media distribution system can then send a notification to the content provider indicating whether the package is a valid package. If the package is not valid, the content provider can make the appropriate corrections and re-submit the package.

The invention can be implemented in numerous ways, including as a method, system, device, apparatus, graphical user interface, or computer readable medium. Several embodiments of the invention are discussed below.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 6 is a diagram illustrating an example of metadata providing information for use in generating a digital media file including a television episode, sporting event, or commercial for distribution.

FIGS. 7A-B together illustrate an example of metadata providing information for use in generating a digital media file including a feature film for distribution.

FIG. 8 is a diagram illustrating an example XML file including metadata of a package for use in generating a television episode.

FIG. 10A is a process flow diagram illustrating a method of processing metadata content by a media content distribution system such as that shown in FIG. 9 in accordance with one embodiment of the invention.

FIG. 10B is a process flow diagram illustrating a method of submitting a package to a media content distribution system such as that shown in FIG. 9 in accordance with one embodiment of the invention.

FIG. 10C is a process flow diagram illustrating a method of processing a package by a media content distribution system such as that shown in FIG. 9 in accordance with one embodiment of the invention.

DETAILED DESCRIPTION OF THE INVENTION

Figure 1:
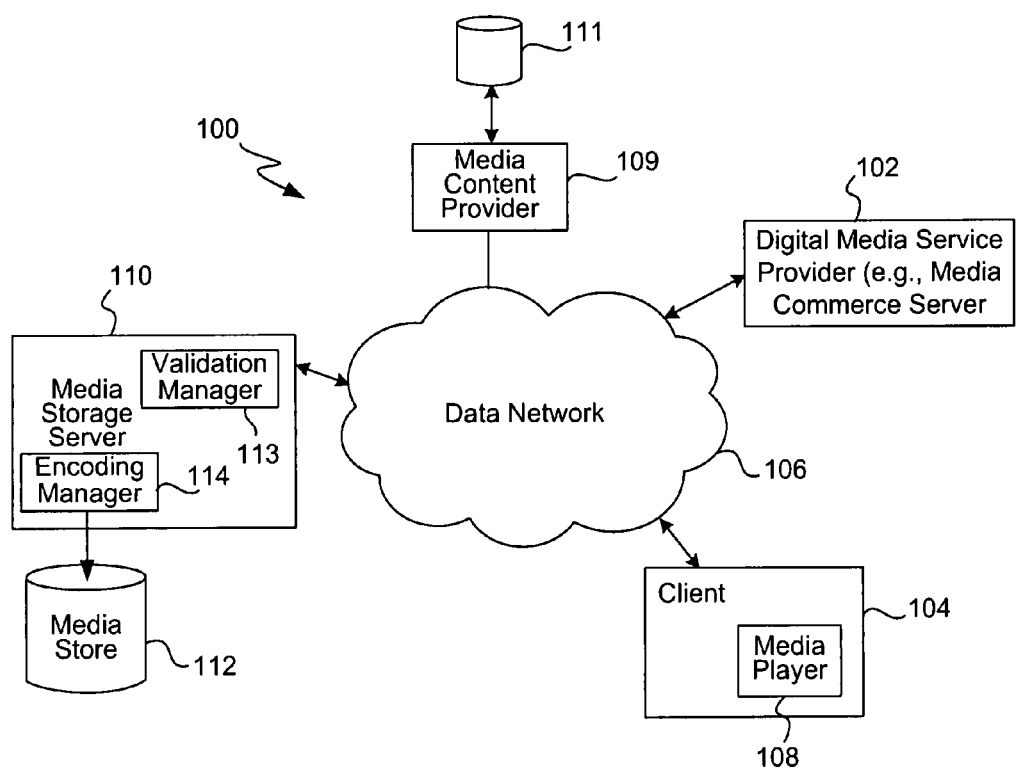
FIG. 1 is a block diagram of a media content submission and distribution system according to one embodiment of the invention.

The present invention relates to the management and submission of media content to a distribution system. More particularly, one embodiment relates to a media package identifying and/or including media content for submission to a distribution system. Another embodiment relates to submission of the media package to the distribution system. Yet another embodiment relates to the generation of media items from media content submitted to a distribution system. Once generated, media items can be downloaded in a client-server environment. A media item can, for example, be a podcast episode, television episode, movie, feature film, audio, video, or image data.

In one embodiment, a package that is submitted to a media submission and distribution system identifies a plurality of data files and includes metadata that defines how the plurality of data files can be used to generate a media item. For instance, a package can identify data files that include a variety of assets, such as subtitles or closed captioning information including timed text tracks, and bonus material, as well as audio and/or video file(s). For instance, the audio file(s) can include audio in surround sound, as well as other audio options in different languages. From the package, it is possible to produce different media items corresponding to the same media content (e.g., television episode or film). More particularly, a media item can be generated (e.g., encoded) using a subset of the metadata and/or a subset of the plurality of data files. For example, some consumers may want subtitles in a particular language, while other consumers may wish to purchase a media item that does not include subtitles. Similarly, some consumers may wish to view the bonus material, while others may not want to pay extra for bonus material that they do not want. Thus, by providing a plurality of data files to a media distribution system, rather than a single encoded file, the distribution system can tailor media items for distribution to a variety of types of consumers.

Embodiments of various aspects of the invention are discussed below with reference to FIGS. 1-8. However, those skilled in the art will readily appreciate that the detailed description given herein with respect to these figures is for explanatory purposes as the invention extends beyond these limited embodiments.

One aspect of the invention pertains to a system and method for submitting media content over a network to a distribution system, enabling media assets (i.e., media items) to be generated from the media content. The resulting media items can then be made available for distribution via the distribution system. For instance, the media items can be purchased and downloaded from an online media store.

In accordance with one embodiment, in order to purchase a media item from the online media store, a potential purchaser can search and browse through numerous media items that are available for purchase. Once purchased, a media item can be downloaded over the network to the purchaser. The content for the media item may then be encrypted for the purchaser's use and stored on the purchaser's machine. Thereafter, the purchaser can make use of the media item (e.g., play the media item). However, the use of the media item can still be limited. For example, only up to a predetermined number user machines can be authorized to use the media item, or only up to a predetermined number of compact disc copies can be made of a grouping or collection of media items (e.g., a playlist).

FIG. 1 is a block diagram of a media content submission and distribution system 100 according to one embodiment of the invention. Media content submission and distribution system 100 includes a digital media service provider such as a media commerce server 102. Media commerce server 102 coordinates review, purchase, and/or rental of media items through on-line transactions. On-line transactions to purchase media items is also referred to as electronic commerce (e-commerce). Media content submission and distribution system 100 also includes a client 104. Typically, media content submission and distribution system 100 would include a plurality of different clients 104. Each client 104 can include a media player 108. Media player 108 is an application program (e.g., software application) that operates on client 104, which is a computing device. Client 104 is coupled to media commerce server 102 through a data network 106. Hence, any of clients 104 can interact with media commerce server 102 to review and/or purchase media items. In one embodiment, data network 106 includes at least a portion of the Internet. Clients 104 can vary with application but generally are computing devices that have memory storage. Often, clients 104 are personal computers or other computing devices that are capable of storing and presenting media to their users.

Media content submission and distribution system 100 is also accessible to one or more media content providers 109. A media content provider 109 may be, for example, a movie studio, television network, or record company providing media content that can be distributed via one or more digital media service providers (e.g., via a media distribution system). Each media content provider 109 may submit media content 111 in the form of packages, as will be described in further detail below. For instance, a package can be submitted in association with a feature film or television episode. Generally, a package includes metadata and identifies a plurality of data files, where the metadata describes how the plurality of data files can be used to generate a downloadable digital media content asset.

Media content submission and distribution system 100 also includes a media storage server 110 and a media store 112. Media storage server 110 represents a remote storage server that couples to the data network 106. Media store 112 provides mass storage for media content that is available for purchase via media content submission and distribution system 100. In accordance with one embodiment, media store 112 stores or has access to packages that have been submitted to media content submission and distribution system 100. In one embodiment, a validation manager 113 validates packages that have been submitted to media content submission and distribution system 100. For instance, validation manager 113 may check the presence (or absence) of files that are identified in a package, check that various attributes of the package are present, check the values of various attributes of the package, and/or check that extensions of one or more of the identified files are correct.

In accordance with another embodiment, an encoding manager 114 encodes media items from metadata and data files identified in packages. Encoding manager 114 can encode the media items as they are purchased, or can encode the media items prior to purchase by a consumer. Thus, media store 112 may store media items that have been generated, as well as store packages that have been submitted for distribution by media content and distribution system 100. Once purchased, the media items can be accessed from media store 112 over the data network 106 by way of media storage server 110.

More particularly, media content and distribution system 100 allows a user of client 104 to utilize media player 108 to browse, search or sort through a plurality of media items that can be purchased from media commerce server 102. Media player 108 may also allow the user to preview a media clip of the media items. In the event that the user of media player 108 desires to purchase a particular media item, the user (via the media player 108) and media commerce server 102 engage in an on-line commerce transaction in which the user pays for access rights to the particular media item. In one embodiment, a credit card associated with the user is credited for the purchase amount of the particular media item.

In media content and distribution system 100 shown in FIG. 1, the media content (e.g., packages and/or media items that have been encoded from the packages) are stored in media store 112 and retrieved via media storage server 110. Hence, media commerce server 102 need not burden its resources to deliver any of the media items that may be purchased to client 104. Instead, on purchasing a particular media item, encoding manager 114 can generate the desired media item (e.g., by encoding the purchased media asset) or obtain a media item that the encoding manager 114 has already generated from a corresponding package. In this regard, encoding manager 114 can obtain the media content corresponding to the particular media item from media store 112 and download such content through data network 106 to client 104. The downloaded media content can then be stored on client 104. In one embodiment, the downloaded media content is stored on client 104 as received. In another embodiment, the downloaded media content is transcrypted from one encryption key to another encryption key before persistent storage on client 104. In still another embodiment, the downloaded media content is encrypted as received at client 104 but is decrypted and then re-encrypted before persistent storage on client 104. Thereafter, media player 108 can present (e.g., play) the media content at client 104.

The connections through data network 106 between media commerce server 102, client 104 and media storage server 110 can be through secure connections, such as Secure Sockets Layer (SSL). Further, the media content may be stored at client 104 in an encrypted manner.

In order to make media content for a media item available for distribution, a media content provider 109 can submit a set of files that can be used in whole or in part to generate the media item. For instance, the set of files can include one or more metadata files including metadata, as well as a plurality of data files. More particularly, the metadata defines how the media item can be generated from the plurality of data files. The set of files can be submitted together, separately, or in groups.

Figure 2:
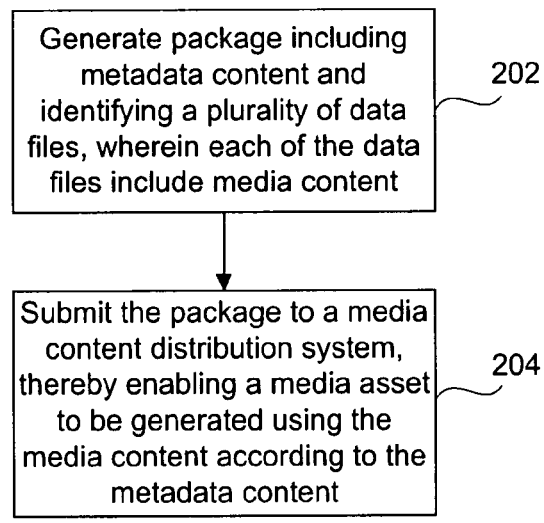
FIG. 2 is a process flow diagram illustrating a method of submitting a package to the media content submission and distribution system according to one embodiment of the invention.

In accordance with one embodiment, a media content provider 109 can submit the set of files in the form of a package. FIG. 2 is a process flow diagram illustrating a method of submitting a package to the media content submission and distribution system according to one embodiment of the invention. A media content provider generates a package including metadata content and identifying a plurality of data files at 202, where each of the data files includes media content. For instance, the package can include one or more metadata files including the metadata content. The metadata content can identify one or more of the plurality of data files.

The media content provider then submits the package to a media content distribution system at 204, thereby enabling a media asset to be generated using the media content according to the metadata content. For instance, upon purchasing a movie in Italian, a media file can be generated using a subset of the plurality of data files that include the Italian audio file and/or Italian subtitles.

In accordance with one embodiment, the package includes the plurality of data files. In another embodiment, upon submission of the package, the media content submission and distribution system requests the data files upon validation of the package. The data files can be submitted in a subsequent package along with the metadata, or the data files can be submitted separately from the package format.

Once the package has been submitted, the package or portion thereof can be stored in a directory structure. For instance, the metadata file(s) can be stored in the top level of the directory structure, with the data files in lower level directories.

Figure 3:
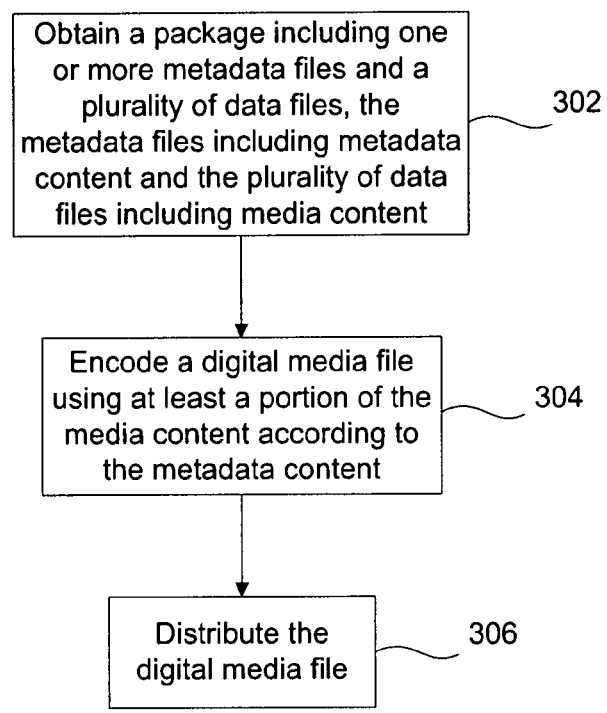
FIG. 3 is a process flow diagram illustrating a method of encoding a digital media asset by a media content submission and distribution system according to one embodiment of the invention.

Once the metadata and media files are stored, a digital media asset can be generated (e.g., encoded) using the information provided in the metadata. FIG. 3 is a process flow diagram illustrating a method of encoding a digital media asset by a media content submission and distribution system according to one embodiment of the invention. A package is obtained (e.g., in response to the purchase of a media item) at 302, where the package includes one or more metadata files that include metadata content and a plurality of data files that include media content. A digital media file is then generated (e.g., encoded) at 304 using at least a portion of the media content according to at least a portion of the metadata content. More particularly, in order to generate a media product, two or more of the plurality of data files can be combined during an encoding process. Generation of the digital media file can include further processing of one or more of the data files, such as transcoding of video files. The digital media file can then be distributed at 306. For instance, the digital media file can be sold, rented, or made available for re-sale. Distribution can include the distribution of the digital media file via the Internet. Alternatively, distribution can include the distribution of a physical media such as a DVD storing thereon the digital media file. Such a physical media can similarly be sold via the Internet, or can be made available for sale in retail stores.

Figure 4:
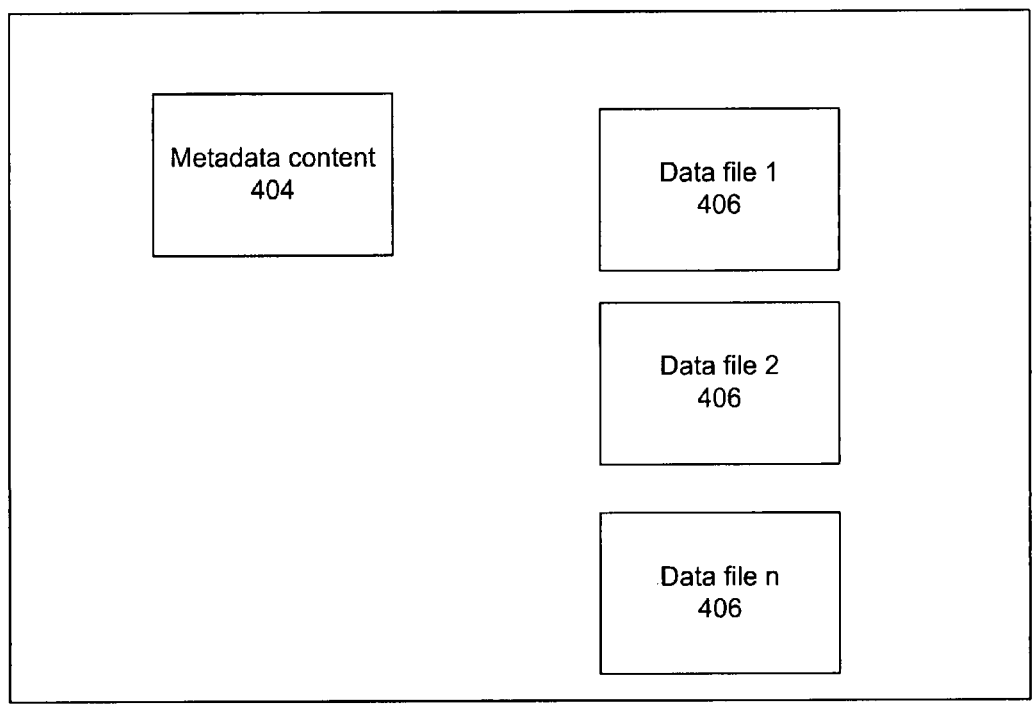
FIG. 4 is a diagram illustrating a simplified package that can be used to submit metadata and media content for use in generating a media product to a media content submission and distribution system.

FIG. 4 is a diagram illustrating a simplified package that can be used to submit metadata and media content for use in generating a media product to a media content submission and distribution system. A package 402 for use in generating a downloadable digital media content asset includes metadata content 404. In addition, the package 402 also includes information identifying a plurality of data files 406, where each of the plurality of data files includes media content. The metadata content describes how the media content in the plurality of data files can be processed to generate a downloadable digital media content asset.

Metadata content 404 can be provided in the form of one or more metadata files. For instance, each metadata file can be provided in the form of an XML file. Moreover, the metadata content 404 can identify one or more of the plurality of data files. In other words, the data files 406 can be identified within the context of the metadata content 404. For instance, the metadata content 404 can identify various image files, audio files, text files, video files, etc. The package 402 can also include the actual data files 406.

Figure 5:
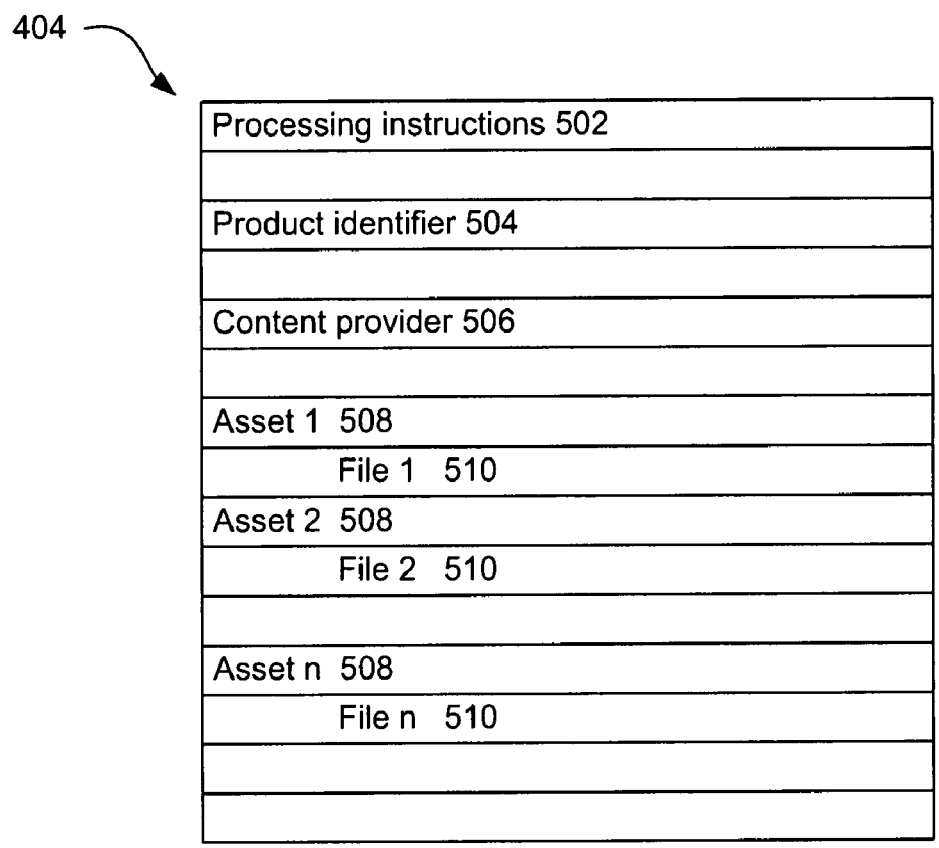
FIG. 5 is a diagram illustrating an example of metadata that can be provided in a package submitted to a media content submission and distribution system.

FIG. 5 is a diagram illustrating an example of metadata content 404 that can be provided in a package submitted to a media content submission and distribution system. As shown in this example, metadata content 404 can include one or more processing instructions (e.g., tags) indicating how the data files submitted are to be processed. The metadata content can also include a number of attributes that include information pertinent to the product. For instance, the metadata content can include identifying information such as a product identifier 504 identifying the corresponding media product (e.g., movie or album) and a content provider identifier 506 identifying the content provider (e.g., record company or movie studio). The metadata content 404 can identify a plurality of assets 508, where each of the assets 508 is provided in a corresponding identified file 510. For instance, each of the assets 508 can include an image, video clip, audio clip, song, feature film, television episode, sporting event, commercial, audiobook, game, etc.

The metadata content 404 can be generated and submitted to the media submission and distribution system in a variety of formats. For example, the metadata content 404 may be described using a plurality of attributes. Some of the metadata attributes may have one or more corresponding data values, as will be described in further detail below with respect to FIGS. 6-7B. More particularly, example metadata content describing a television episode will be described in further detail below with reference to FIG. 6, while example metadata content describing a feature film will be described in further detail below with reference to FIGS. 7A-7B.

FIG. 6 is a diagram illustrating an example of metadata providing information for use in generating a digital media file including a television episode, sporting event, or commercial for distribution. In order to ensure that the metadata can be parsed, it may be desirable to indicate the manner in which the document is generated and/or encoded. As shown in FIG. 6, a processing instruction 602 can be used to define the character encoding of the document that is submitted. For instance, the processing instruction 602 can indicate that the document is encoded via UTF-8 encoding. In addition, a package container version 604 can indicate a version of the specification to which the metadata conforms. For instance, the version can indicate that the metadata conforms to a television specification, as well as the specified version of the television specification. For example, the version "tv2.0" can be used to indicate that the metadata conforms to version 2 of the television specification.

In addition, a content provider 606 providing content to the submission and distribution system can be identified. For example, the content provider 606 can be a television network. The specification of the content provider 606 in the metadata enables the product to be associated with the content provider 606, as well as enable any pertinent contracts to be identified.

As set forth above, the metadata may identify those assets that are being submitted in association with the package. A different set of metadata attributes and corresponding values is provided for each different asset that is being submitted in association with the package. One type of asset that can be submitted in the package (or in association with the package) is a video. For each video that is submitted, a different set of corresponding metadata attributes and associated values is provided. For instance, if a video is being provided in the package, the metadata can include a video attribute (e.g., tag) 608. More particularly, a video tag can be used to signify the beginning of the video element of the package. In accordance with one embodiment, one video element can be defined per TV episode.

A video type 610 can be used to indicate how the media submission and distribution system should process the video. For instance, the video type 610 can indicate that the video type is television or "tv." A television video type can be used to indicate that the video is a television series episode, sporting event, or commercial.

A network name 612 can be used to identify a network that airs the video. For instance, the network name can be a customer presentable name such as "NBC." Thus, the media product can be encoded such that the network name 612 is displayed when the media product is played.

A vendor identifier 614 can be used to identify the video separately from any other video submitted by a content provider. The vendor identifier 614 can be used to uniquely identify the video in the media submission and distribution system. In one embodiment, the vendor identifier may consist of uppercase alphanumeric characters and the underscore mark.

An episode production number 616 can identify a production number for the episode. In this manner, an episode of a series can be uniquely identified. The episode production number 616 can be provided via a display, enabling a purchaser to uniquely identify the episode of a series. A series name 618 can be used to identify the name of the television series or sporting event. In addition, a title 620 can be used to uniquely identify the title of the episode contained in the video.

In one embodiment, a container identifier 622 can be used to identify episodes of a particular season. For instance, a container identifier 622 such as "NBC_OFFICE_SEASON_002" can be used to identify the second season of The Office. Each video within a container can be identified by a container position 624. For instance, a an 18$^{th}$ episode in a season can be identified by container position 18.

A release date 626 can be used to identify the original air date of the episode. In one embodiment, the release date 626 is in the format YYYY-MM-DD, where YYYY is the 4 digit year, MM is the 2-digit month, and DD is the 2-digit day. In addition, an original release year 628 can be used to identify the year that the video was originally made available.

In addition, a genre 630 in which the television series episode, sporting event, or commercial has been categorized can be provided. For instance, a genre can be Action & Adventure, Anime, Classics, Comedy, Documentary, Drama, Foreign, Horror, Independent, Kids & Family, Music, Romance, Sci-Fi & Fantasy, Short Films, Special Interest, Thriller, Sports, Western, or Urban. Of course, these examples are merely illustrative, and a television show could be categorized in other genres.

A rating 632 can be used to specify a rating label for the corresponding media product. In one embodiment, more than one rating can be specified (e.g., for multiple rating systems, which may correspond to different countries). For instance, a rating label within the US-TV system can be TV-Y, TV-Y7, TV-G, TV-PG, TV-14, or TV-MA.

Similarly, the metadata can further specify one or more content advisory indicators 634. For instance, within the US-CABLE system, possible content advisories include Violence (V), Mild Violence (MV), Graphic Violence (GV), Adult Language (AL), Graphic Language (GL), Adult Content (AC), Sexual Content (SC), Nudity (N), Brief Nudity (BN), and Rape (RP). Within the US-TV system possible content advisories include Fantasy Violence (FV), Sexual Content (S), Violence (V), Language (L), and Dialogue (D).

In addition, a copyright 636 can be specified for the video. In one embodiment, the copyright 636 is provided in the format "year" followed by "owner."

The metadata can include a short description 638, as well as a long description 640. The short description 638 can include a single sentence describing the video. The long description 640 can include a brief synopsis of the video.

If video source material is delivered electronically, the metadata can include a data file element (e.g., tag) 642 for each file being submitted. For instance, a file name 644 and file size 646 can be specified. The file name 644 should include the file name extension (e.g., mpg). In addition, a checksum 648 can be provided, enabling the media submission and distribution system (or content provider) to ensure that the correct file has been provided or uploaded to the system. In accordance with one embodiment, a hashing function can be used on the file to determine whether the resulting value matches the checksum value that was provided in the metadata.

The metadata can also include a preview start time 650, which enables a content provider to specify a custom start time for a preview video. For instance, the preview start time 650 can specify a number of seconds from program start at which a preview video is to begin. A vendor offer code 652 can be used as an identifier for accounting purposes.

In one embodiment, a product element 654 defines a product for each territory in which a video is to be sold. For instance, a territory 656 attribute can be used to identify a territory. As one example, the territory 656 can specify a territory country code, such as "US." World-wide clearances can be specified using a World-wide country code "WW."

The metadata can further include a sales start date 658 specifying a date that the video is to be made available for sale to customers. If this element is omitted, the video can be assumed to be for sale immediately. A sales end date 660 can similarly specify a date that the video can no longer be made available for purchase (e.g., via an online media store). If no value is specified, it can be assumed that the video can be sold indefinitely. A cleared for sale attribute 662 can indicate whether the video is cleared for sale. For instance, the media submission and distribution system can ascertain whether the video is cleared for sale according to contracts with the content provider.

FIGS. 7A-B together illustrate an example of metadata providing information for use in generating a digital media file including a feature film for distribution. The metadata can include a plurality of attributes. In order to ensure that the metadata can be parsed, it may be desirable to indicate the manner in which the document is generated and/or encoded. As shown in FIG. 7, a processing instruction 702 can be used to define the character encoding of the document that is submitted. For instance, the processing instruction 702 can indicate that the document is encoded via UTF-8 encoding. In addition, a package container version 704 can indicate a version of the specification to which the metadata conforms. For instance, the version can indicate that the metadata conforms to a film specification, as well as the specified version of the film specification. For example, the version "film2.1" can be used to indicate that the metadata conforms to version 2.1 of the film specification.

In addition, a content provider 706 providing content to the submission and distribution system can be identified. For example, the content provider 706 can be a television network or a movie studio such as "Paramount." The specification of the content provider 706 in the metadata enables the product to be associated with the content provider 706, as well as enable any pertinent contracts to be identified.

As set forth above, the metadata may identify those assets that are being submitted in the package. One type of asset that can be submitted in the package is a video. If a video is being provided in the package, the metadata can include a video attribute (e.g., tag) 708. More particularly, a video tag can be used to signify the beginning of the video element of the package. In accordance with one embodiment, one video element can be defined per movie.

A video type 710 can be used to indicate how the media submission and distribution system should process the video. For instance, the video type 710 can indicate that the media content being submitted is a film. More particularly, in one embodiment, the video type is "film" for feature films or "short" for short films under one hour in length.

A production company attribute 712 can be used to identify a customer presentable name of the production company that created the film. For instance, the production company can be "Paramount Pictures."

A vendor identifier 714 can be used to identify the video separately from any other video submitted by a content provider. The vendor identifier 714 can be used to uniquely identify the video in the media submission and distribution system. For instance, a value such as an International Standard Audiovisual Number (ISAN) or Universal Product Code (UPC) can be used as the vendor identifier 714. In one embodiment, the vendor identifier may consist of uppercase alphanumeric characters, the underscore mark, and dashes. An ISAN identifier 716 and UPC 718 can also be separately identified. The UPC 718 can be used if the film is sold as physical media in stores. In addition, an All Movie Guide Video ID (AMG V_ID) 720 can be provided. The AMG V_ID can be obtained from an AMG Database Dictionary for Movies or from an AMG Movie Overview page.

A title 722 can be used to uniquely identify the title of the film contained in the video. An original release year 724 can identify the year the film was originally released for public viewing in the theater, on television, or on physical media. A country of origin 726 can identify the country in which the film was primarily produced.

One or more genres 728 can be identified for a film. For instance, a possible genre can be Action & Adventure, Anime, Classics, Comedy, Documentary, Drama, Foreign, Horror, Independent, Kids & Family, Music, Romance, Sci-Fi & Fantasy, Short Films, Special Interest, Thriller, Sports, Western, or Urban.

One or more ratings 730 can be specified for the media content being submitted. For instance, the MPAA system supports the following ratings: General Audience (G), GP, Parental Guidance Suggested (PG), Parents Strongly Cautioned (PG-13), M, Restricted®, No One 17 and Under Admitted (NC-17), X, and Unrated (UR). A system attribute can be used to specify the MPAA rating system. A reason attribute can also be provided, which indicates a reason for the specified rating. For example, a reason for a PG-13 rating may indicate that a film was "Rated PG-13 for drug content, some sensuality and war violence."

A copyright 732 can also be specified for the video. In one embodiment, the copyright 732 is provided in the format "year" followed by "owner."

Information associated with the cast 734 of a film can also be specified. For instance, cast actors can be listed along with the character name portrayed by the actor. The name of an actor can be provided where the last name comes first. In addition, the actor's name can also be specified in the manner in which it would naturally be displayed (e.g., where the first name comes before the last name). An All Movie Guide person ID assigned to the actor can also be specified. If an actor requires top billing for the film, a billing attribute can indicate that the actor requires top billing.

Similarly, information associated with the crew 736 can also be specified. For instance, crew members can be listed along with the role (e.g., Director) that they performed. The name of a crew member can be provided where the last name comes first. In addition, the crew member's name can also be specified in the manner in which it would naturally be displayed (e.g., where the first name comes before the last name). An All Movie Guide person ID assigned to the crew member can also be specified. If a crew member such as the Director requires top billing for the film, a billing attribute can indicate that the crew member requires top billing.

A synopsis 738 including a general summary of the film's content and story line can be provided.

An asset description 740 may describe the delivered assets for the film. If video source material is delivered electronically, the metadata can include a data file element (e.g., tag) for each file being submitted. For instance, a file name 742 and file size 744 can be specified. The file name 742 should include the file name extension (e.g., mpg). In addition, a checksum 746 can be provided, enabling the media submission and distribution system to ensure that the correct file has been provided or uploaded to the system. Similarly, a poster image can be identified by file name 748. A checksum 750 corresponding to the poster image file can also be specified.

Bonus material 752 can also be submitted. Bonus material 752 can be identified by filename, for example. Bonus material 752 can include, for example, material such as a video showing the making of the film, or additional footage not shown in the film. Alternatively, the bonus material 752 could include a digital booklet or an interactive booklet. A vendor identifier 754 can be used as an identifier for the bonus material. Vendor identifier 754 can be unique with respect to other vendor identifiers of any other bonus material in the same package. Vendor identifier 754 can be used to relate bonus material updates (e.g., sent in a package after the initial package delivery) to the correct item of bonus material. As long as the vendor identifier is specified, any other attribute of the bonus material, including the file name, can be changed. In one embodiment, if a vendor identifier 754 is not specified, the file name of the bonus asset can be used implicitly as the vendor identifier and therefore cannot be changed. In other words, submission of additional bonus material would result in a second item of bonus material being added. A name 756 of the bonus material that can be provided for display in an online media store can be provided, as well as any copyright 758 of the bonus material. In addition, a volume number 760 of the bonus material can be submitted. A track number 762 of the bonus material can also be specified for use in ordering the bonus material among other items within the same volume within the package. In other words, the volume number and track number can be unique across all track items in the package. A pre-order only 764 attribute can indicate whether the bonus material item is only made available to customers who purchase the pre-order. A bonus file name 766 identifies the file that contains the bonus material being submitted.

In one embodiment, a product element 768 defines a product for each territory in which a video is to be sold. For instance, a territory 770 attribute can be used to identify a territory. As one example, the territory 770 can specify a territory country code, such as "US." World-wide clearances can be specified using a World-wide country code "WW."

The content provider can have one or more contracts with the media submission and distribution system for distributing media content. In the contracts, a wholesale price tier can be identified. Thus, a wholesale price tier 772 identifying a wholesale price tier for the video can be specified.

If it is possible to pre-order the media content, a pre-order sales start date 774 indicating a date on which a pre-order should become available (e.g., in the territory that the product is for) can be specified. The pre-order can end (and fulfill) on the regular sales start date of the product. If a pre-order sales start date 774 is not specified, a pre-order is not available (e.g., within the specified territory for the product).

The metadata can further include a sales start date 776 specifying a date that the video is to be made available for sale to customers. If this element is omitted, the video can be assumed to be for sale immediately. A sales end date 778 can similarly specify a date that the video can no longer be made available for purchase (e.g., via an online media store). If no value is specified, it can be assumed that the video can be sold indefinitely. A cleared for sale attribute 780 can indicate whether the video is cleared for sale. For instance, the media submission and distribution system can ascertain whether the video is cleared for sale according to contracts with the content provider.

Often, videos such as movies are divided into chapters for easy access by viewers. Thus, chaptering information for one or more chapters associated with the media content can also be submitted. For instance, the chaptering information can be provided in the same or a different XML file.

Chaptering information can be submitted in conformance with a chaptering metadata format. As shown in FIG. 7B, a chapters version 782 can indicate a version of the chaptering metadata format in use. For instance, the chapters version 782 can be version 1.

A chapter element can define a chapter in the provided media by specifying a chapter start time 784. More particularly, the start time 784 indicates the start time of that chapter in the video stream. For example, the start time can be specified in hours, minutes, and seconds in a format such as hours:minutes:seconds. A chapter title 786 associated with the chapter can also be provided. If no chapter title 786 is provided, a default title such as "Chapter n" can be displayed upon viewing the media, where n is the chapter number starting at 1. In addition, a chapter picture filename 788 identifying a file including an image to be used to represent the chapter can be provided.

A package such as that illustrated in FIG. 6 or FIGS. 7A-B can be submitted for use in submitting a media item to media submission and distribution system. Once submitted, updates can be submitted using the same package format.

Metadata such as that described above with reference to FIGS. 6-7B can be provided in the form of one or more XML files. FIG. 8 is a diagram illustrating an example XML file including metadata of a package for use in generating a digital media file including a television episode. More particularly, different metadata tags can be used to identify the various metadata attributes such as those described above with reference to FIG. 6. As shown in this example, XML file 800 can include an <XML version> tag 802 identifying the processing instruction 602. In addition, a <package version> tag 804 can identify the package container version 604, while a <provider> tag 806 identifies the content provider 606.

For each video being submitted with the package, a different set of corresponding XML tags and associated values can be provided. In this example, a <video> tag 808 can be used to indicate the beginning of the video element 608, as well as the end of the video element 608. A <type> tag 810 can include the video type 610. Similarly, a <network name> tag 812, <vendor id> tag 814, <episode production number> tag 816, <series name> tag 818, <title> tag 820, <container id> tag 822, <container position> tag 824, <release date> tag 826, and <original release year> tag 828 can identify the corresponding network name 612, vendor identifier 614, episode production number 616, series name 618, title 620, container ID 622, container position 624, release date 626, and original release year 628.

A <genres> tag 830 can be used to delineate the genres section of the metadata content as set forth above with respect to 630. For each genre, a <genre> tag 832 can be provided. Another <genres> tag 834 can be used to designate the end of the genres section of the metadata content.

A <ratings> tag 836 can be used to delineate the ratings section of the metadata content. A <rating> tag 838 can be used to specify each rating value, as set forth above with respect to 632 of FIG. 6. Similarly, an <advisory> tag 840 can be used to specify each advisory 634. Another <ratings> tag 842 can be used to designate the end of the ratings section of the metadata content.

A <copyright> tag 844 can be used to identify a copyright 636. In addition, a <short description> tag 846 can be used to provide a short description 838, while a <long description> tag 848 can be used to provide a long description 840.

For each data file that is provided, a <data file> tag 850 can be used to define the data file section as described above at 642. A <file name> tag 852 can be used to define the file name 644. In addition, a <size> tag 854 can be used to define the size 64 of the data file, while a <checksum> tag 856 can be used to define a calculated checksum value as described above at 648. Another <data file> tag 858 can be used to designate the end of the data file section of the metadata content.

A <preview starttime> tag 860 can be used to define the preview start time 650. Similarly, a <vendor offer code> tag 862 can be used to identify the vendor offer code 652.

A <products> tag 864 can be used to delineate the products section of the metadata. For each product element 654, a <product> tag 866 can be provided, followed by a <territory> tag 868, <sales start date> tag 870, <sales end date> tag 872, and/or <cleared for sale> tag 874, corresponding to the territory 656, sales start date 658, sales end date 660, and/or cleared for sale indicator 662 that are provided in the metadata. Another <product> tag 876 can be used to define the end of the information for a single product, while another <products> tag 878 can be used to define the end of the products section of the metadata.

The example described above with reference to FIG. 8 is directed to a television episode in accordance with the format described with reference to FIG. 6. A similar XML file can be generated for use in specifying information for a film in accordance with a format such as that described above with reference to FIGS. 7A-B.

Figure 9:
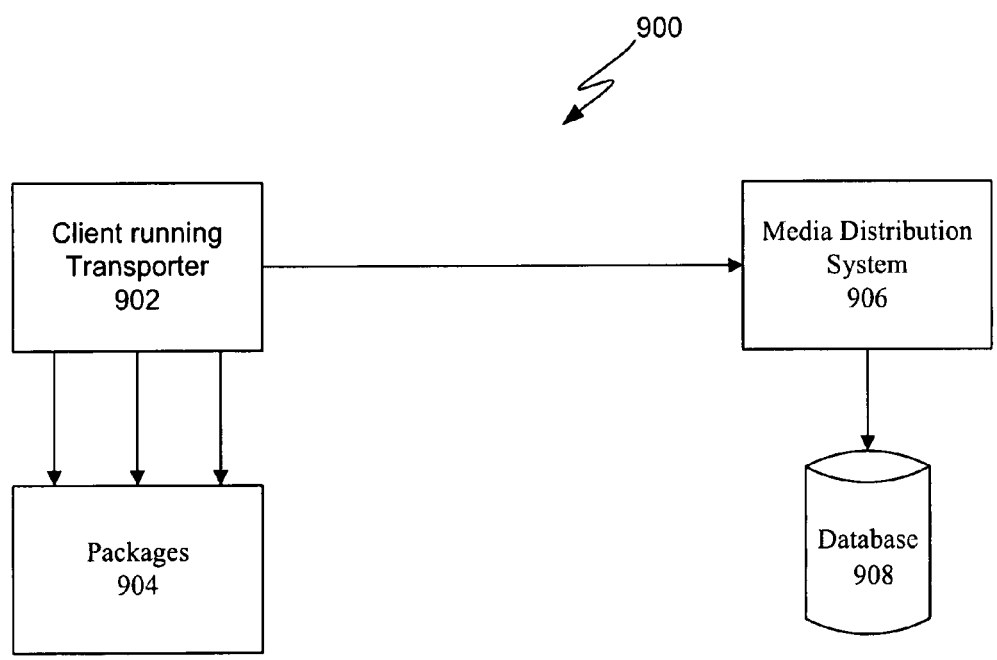
FIG. 9 is a simplified diagram illustrating a system supporting the submission of a package to a media content distribution system.

FIG. 9 is a simplified diagram illustrating an example system supporting the submission of a package to a media content distribution system. Media content submission system 900 supports the submission of metadata, as well as media content data. More particularly, a client 902 can run a Transporter supporting the uploading of metadata and/or media content data. Metadata and/or media content data can be submitted separately, or in combination, via a data structure such as a package. The Transporter can also support the validation of the metadata and/or media content data prior to its submission. For instance, the Transporter can validate the metadata and/or media content data against a metadata format and/or package specification such as that described above. Although a single client 902 is shown in this example, media content submission system 900 can support a plurality of clients 902, enabling partners and content providers to deliver metadata and/or media content data to a digital content distributor (e.g., Apple).

In one embodiment, client 902 has access to a set of one or more packages 904. Client 902 can submit metadata and/or media content data associated with one or more packages to Media Distribution System 906. Upon receipt of metadata and/or media content data, Media Distribution System 906 can validate the metadata and/or media content data. For instance, Media Distribution System 906 can validate the metadata and/or media content data against a metadata format or package specification such as that described above. Media Distribution System 906 can store metadata and/or media content data in a database 908. more particularly, metadata can be stored separately from media content data. Alternatively, metadata and media content data can be stored together (e.g., in the form of one or more packages).

Media Distribution System 906 can include one or more servers. The servers can be implemented in an extensible manner so as to meet business needs without necessitating revisions to Client 902 due to the nature of it's loosely-coupled interface that can be implemented using a distributed architecture.

In one embodiment, a client can submit metadata prior to submitting associated media content data. FIG. 10A is a process flow diagram illustrating a method of processing metadata content by a media content distribution system such as that shown in FIG. 9 in accordance with one embodiment of the invention. Client optionally validates the metadata prior to sending the metadata at 1000. When the metadata is received at 1002, the metadata can be validated at 1004 by media content distribution system. As will be described in further detail below, validation may include checking the metadata against a metadata specification such as that described above. If the metadata is determined not to be valid at 1006, a notification can be sent at 1008 indicating that the metadata is not valid. For instance, an error message may indicate a reason that the metadata does not conform with a particular metadata specification. If the metadata is determined to be valid at 1006, a notification indicating a request for submission of the corresponding media content data can be sent at 1010. For instance, the notification may indicate that the metadata has been successfully validated. Once a client receives confirmation that metadata has been successfully validated, the client can submit the associated media content data. The client can submit the media content data separately from the metadata. Alternatively, the client can submit the media content data along with the metadata that has already been submitted. For instance, the client can submit a package including the media content data and associated metadata.

As set forth above, metadata can be submitted prior to its corresponding media content data. Alternatively, metadata can initially be submitted with its corresponding media content data. In either case, media content data can be submitted in a package format such as that described herein.

FIG. 10B is a process flow diagram illustrating a method of submitting a package to a media content distribution system such as that shown in FIG. 9 in accordance with one embodiment of the invention. A client composes a package at 1012. The client can determine whether the package is a valid package at 1014. For instance, the client can determine whether the metadata is valid (e.g., conforms to a metadata specification). If the package is determined not to be valid at 1016, the client can choose not to submit the package at 1018. However, if the package is determined to be valid at 1016, the client can submit the package at 1020.

FIG. 10C is a process flow diagram illustrating a method of processing a package by a media content distribution system such as that shown in FIG. 9 in accordance with one embodiment of the invention. When media distribution system receives a package at 1022, media distribution system can determine whether the package is valid at 1024. For instance, media distribution system can determine whether the metadata is valid (e.g., conforms to a metadata specification). If the package is determined not to be valid at 1026, media distribution system can send an error message at 1028. If the package is determined to be valid at 1026, media distribution system can accept the package at 1030. The package or portion thereof can then be stored to a database.

Figure 11:
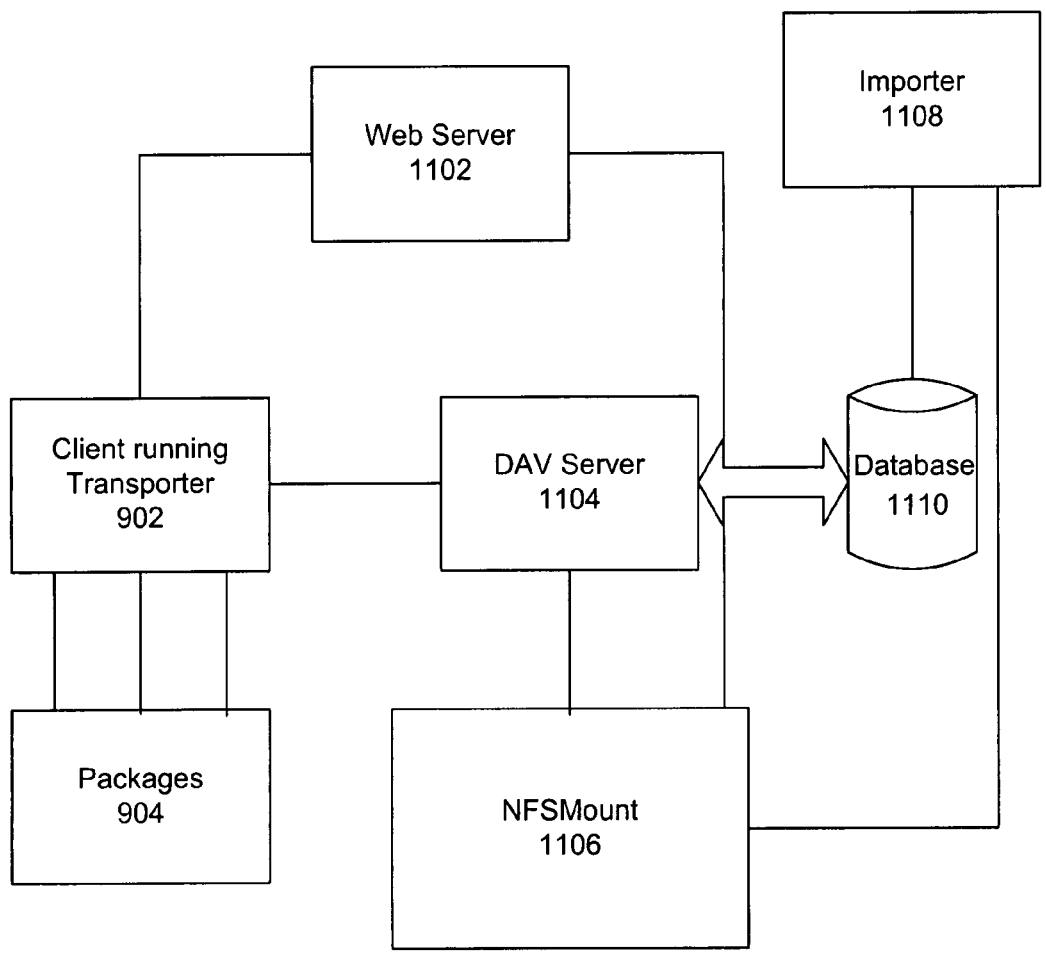
FIG. 11 is a diagram illustrating an example system supporting the submission of a package to a media content distribution system.

FIG. 11 is a diagram illustrating an example system supporting the submission of a package to a media content distribution system. As described above, client 902 running a Transporter can access and upload one or more packages 904. More particularly, client 902 can upload metadata and/or media content data. This can be accomplished via communication with a Web Server 1102 and/or DAV Server 1104. DAV Server 1104 can operate delivery protocol DAV. Thus, if a network connection fails or a server goes offline, Transporter can resume an upload that was already in progress. Communication between client 902 and Web Server 1102 and/or DAV Server 1104 can be done using SOAP. With loose coupling of SOAP message architecture and WebDAV delivery architecture, the Transporter permits another protocol to be implemented instead of DAV. For example, a different protocol can be used to deliver large files, such as video files, at a faster rate.

In one embodiment, Transporter is a Java-based command-line tool. Transporter can obtain a username, password, content provider identifier for which media distribution system is providing, and/or metadata.

Client 902 can submit the username, password, content provider identifier, and/or metadata to Web Server 1102. Web Server 1102 can then authenticate the identity of the content provider, username and/or password. Upon authentication, Web Server 1102 can validate the metadata.

Assuming that the metadata has been successfully validated, client 902 can submit media content data associated with the metadata to Web Server 1102 and/or DAV Server 1104. More particularly, the media content data can be submitted to Web Server 1102, which can then provide the media content data to DAV Server 1104. In one embodiment, client 902 submits a package including the metadata and media content data. Thus, client 902 can resubmit the previously validated metadata. Client 902 can validate the package (e.g., metadata) prior to its submission.

Upon submission of metadata and/or media content data, the metadata and/or media content data can be validated. At least a portion of the metadata and/or media content data can be stored to a repository such as NFSMount 1106. Importer 1108 can retrieve the metadata and/or media content data, or portion thereof. Importer 1108 can store the metadata and/or media content data retrieved to database 1110. Moreover, Importer 1108 can store data associated with the metadata and/or media content data to database 1110. For instance, Importer 1108 can store data such as timestamps associated with metadata and/or media content data that has been submitted.

Figure 12:
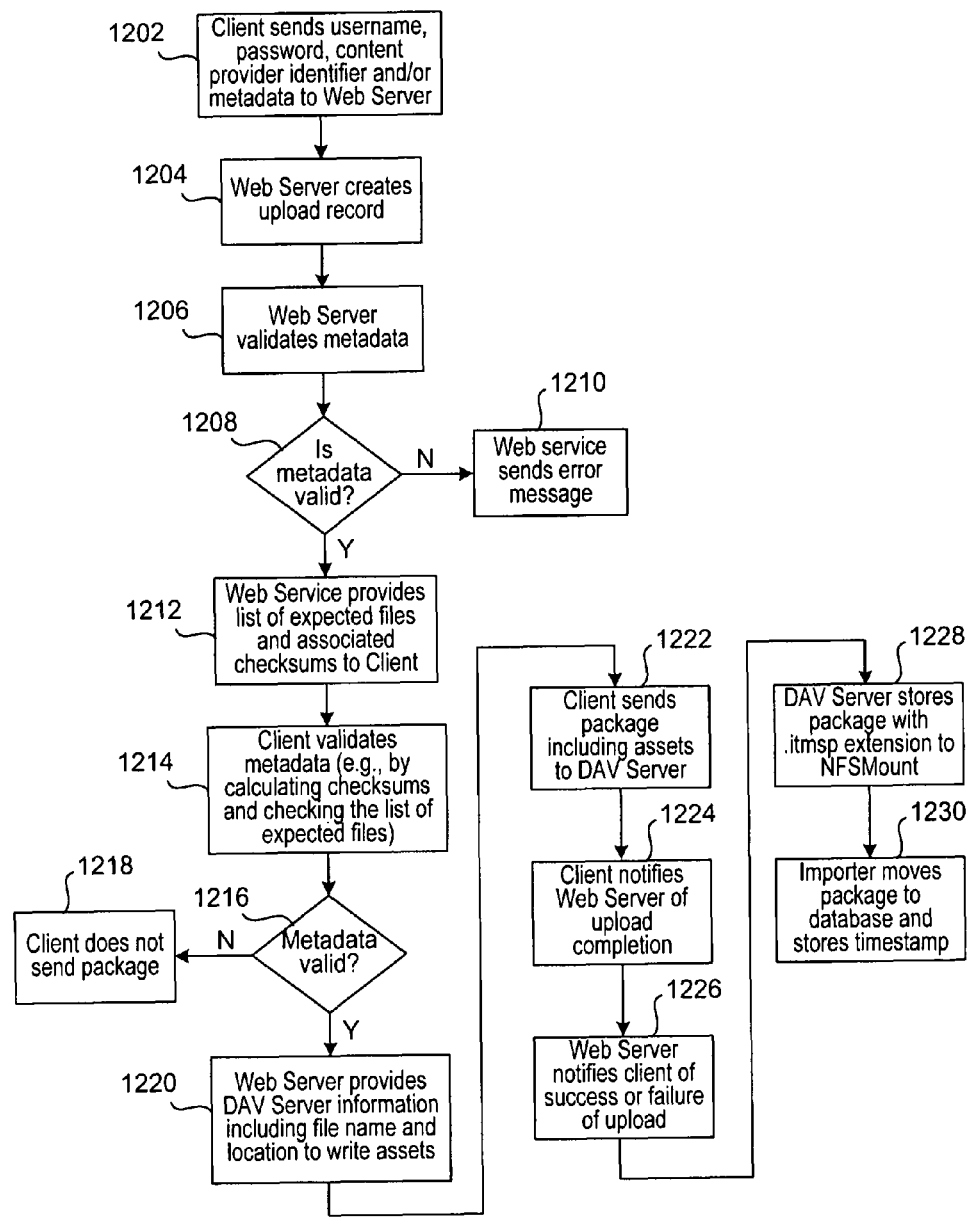
FIG. 12 is a process flow diagram illustrating a method of submitting a package to a media content distribution system such as that shown in FIG. 11 in accordance with one embodiment of the invention.

FIG. 12 is a process flow diagram illustrating a method of submitting a package to a media content distribution system such as that shown in FIG. 11 in accordance with one embodiment of the invention. Client can send a username, password, content provider identifier and/or metadata to a Web Server at 1202. Web Server can authenticate the user's credentials using the username, password, and/or content provider identifier. Assuming that the user has been authenticated, Web Server can create an upload record indicating that the metadata has been uploaded at 1204. Web Server can validate the metadata at 1206. One method of validating metadata by a Web Server will be described in further detail below with reference to FIG. 13. If the metadata is determined not to be valid at 1208, Web Server can send an error message at 1210. Such an error message can be a general message, or can indicate a reason that the metadata does not conform to a particular metadata specification. If the metadata is determined to be valid at 1208, Web Server can send a message indicating that the corresponding media content can be uploaded. For instance, Web Server can provide a list of expected files and associated checksums identified in the metadata to client at 1212. Client can subsequently validate the metadata at 1214. One method of validating metadata by a client will be described in further detail below with reference to FIG. 14. More particularly, client can use this information to verify that a package that is uploaded includes each of the expected files, as well as ensure that calculated checksums for the files match the checksums that have been provided in the metadata. If client determines that the metadata is not valid at 1216, client can decide not to send the media content data or package at 1218. However, if client determines that the metadata is valid at 1216, client can upload media content data.

In order to upload media content data, Web Server can provide DAV Server information such as file name and a location to write assets at 1220. Client can send a package including media assets to DAV Server at 1222. Client can notify Web Server of upload completion at 1224. Web Server can then notify Client of success or failure of upload completion at 1226. For instance, Web Server can request that a package be re-submitted if it is determined that the package is not a valid package (e.g., upon validation of metadata and/or the package contents). Upon successful upload of a package, DAV Server can store the package (or portion thereof). In one embodiment, the package is stored with a specific extension (e.g., .itmsp) to NFSMount at 1228. Importer can move the package or store information associated with the package to a database at 1230 and store a timestamp associated with the package.

Figure 13:
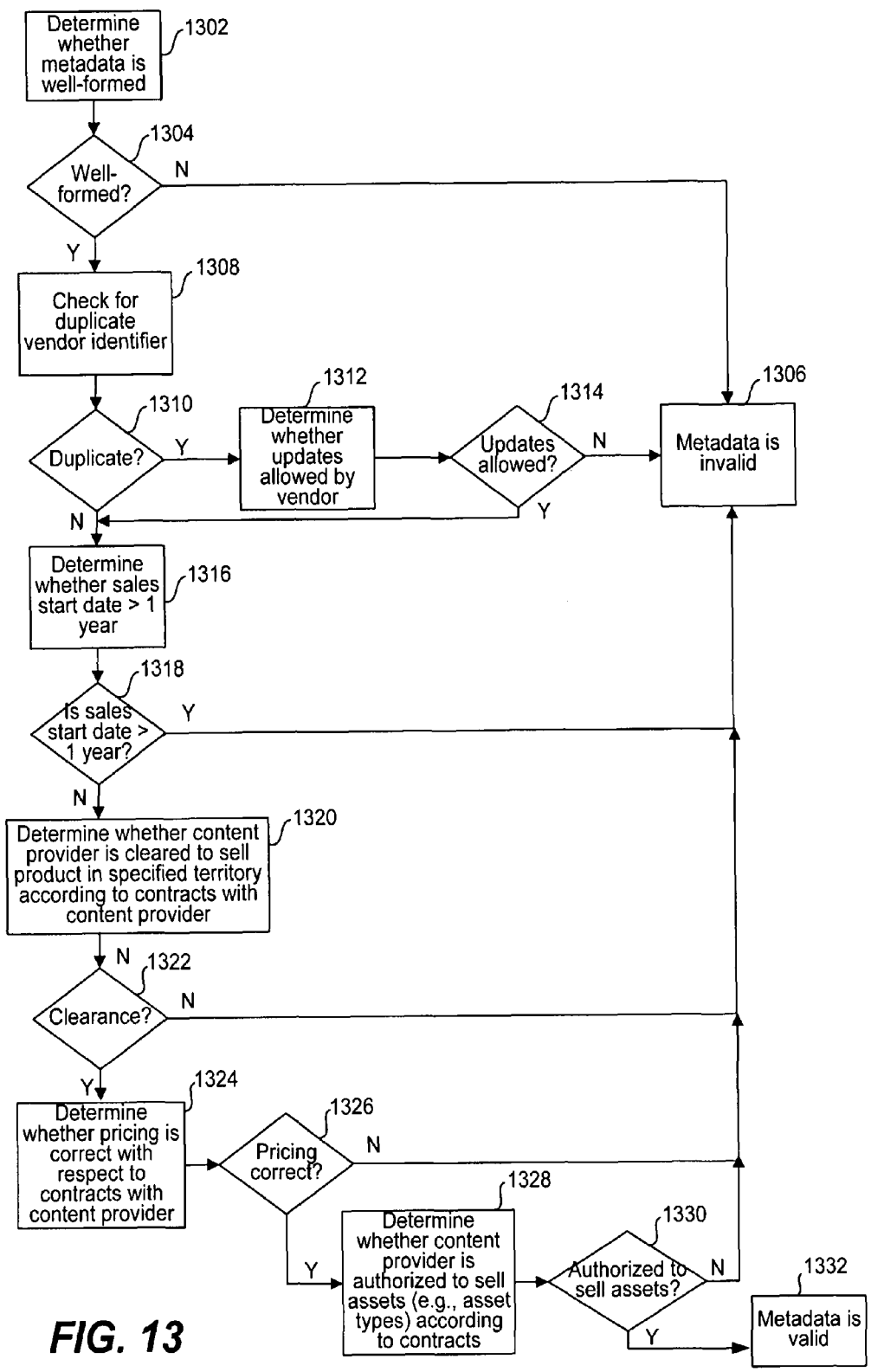
FIG. 13 is a process flow diagram illustrating a method of validating metadata by the Web Server as shown at 1206 of FIG. 12.

Upon receiving metadata or a package including metadata, the metadata can be validated. FIG. 13 is a process flow diagram illustrating a method of validating metadata by a server receiving metadata or a package including metadata as shown at 1206 of FIG. 12. Server can determine whether the metadata (or portion thereof) is well-formed at 1302. In other words, the format of at least a portion of the metadata content can be validated. More particularly, Server can determine whether one or more identifiers in an XML document are well-formed. For instance, Server can determine whether a UPC or checksum is in the correct format. If the metadata is not well-formed at 1304, the metadata is not valid 1306. If the metadata is determined to be invalid, Client is prevented from uploading associated media content data. If the metadata is well-formed, further processing on the metadata can be performed.

Server can also check for a duplicate vendor identifier at 1308. More particularly, Server can obtain a vendor identifier from the metadata content to ascertain whether the vendor identifier is associated with media content that has previously been received. If media content associated with the vendor identifier has already been received at 1310, Server can determine whether the content provider is permitted to submit updates (e.g., pricing updates) to the media content at 1312. If updates are not allowed at 1314, the metadata is invalid at 1306. If updates are allowed, the metadata can be further processed.

As set forth above, the metadata content can include a sale start date. Server can determine whether the sale start date begins within a pre-determined period of time from a particular date (e.g., current date) at 1316. For instance, Server can determine whether the sale start date begins within a year. In order to ensure compliance with Sarbanes Oxley??, if the sale start date is greater than a year at 1318, the metadata is invalid at 1306.

Although not shown in this example, Server can also verify information associated with media content that can be ordered via a pre-order. Such verification can occur at the time of submission or at a later date. More particularly, the metadata content can include a pre-order sale start date. Server can determine from the identification of the plurality of data files in the metadata content whether saleable content (e.g., a trailer or poster art) is identified. The metadata content may be determined to be invalid if saleable content is not identified upon submission or within a pre-determined period of time within the pre-order sale date.

Server can also determine whether the content provider is cleared to sell a product including the media content in a territory specified in the metadata content according to contract(s) with the content provider at 1320. More particularly, Server can identify from the metadata content a territory in which the media content is to be sold in order to determine from one or more contracts whether the content provider is cleared to sell the media content in the territory. If the content provider does not have clearance at 1322 to sell the product tin the specified territory, the metadata is invalid at 1306.

Similarly, the metadata can be checked to ensure correct pricing. Thus, Server can determine whether pricing is correct with respect to contract(s) with content provider at 1324. More particularly, a price tier within the metadata content can be identified in order to determine from one or more contracts whether the price tier is valid. If pricing is not correct at 1326, the metadata is invalid at 1306.

Server can also perform additional checks. For instance, Server can determine whether the content provider is authorized to sell the assets (e.g., asset types) according to contract(s) with the content provider at 1328. More particularly, Server can identify a type of media contained in at least one of the data files identified in the metadata content. The Server can then determine whether the content provider is permitted to sell the type of media content. For instance, the content provider may be authorized to sell (e.g., submit) audio content, but not video content. If the content provider is not authorized to sell the assets at 1330, the metadata is invalid at 1306. However, if the content provider is authorized to sell the assets, the metadata is valid at 1332.

Upon determining that the metadata is valid, Server can notify client that media content corresponding to the metadata is requested. Server can send a public key for use in encrypting the media content, enabling the data files (or package) to be encrypted prior to their submission.

In addition to validating the metadata, it is possible to perform other checks. For instance, when a package is received, it may be desirable to check that the plurality of data files identified in the metadata exist in the package.

Figure 14:
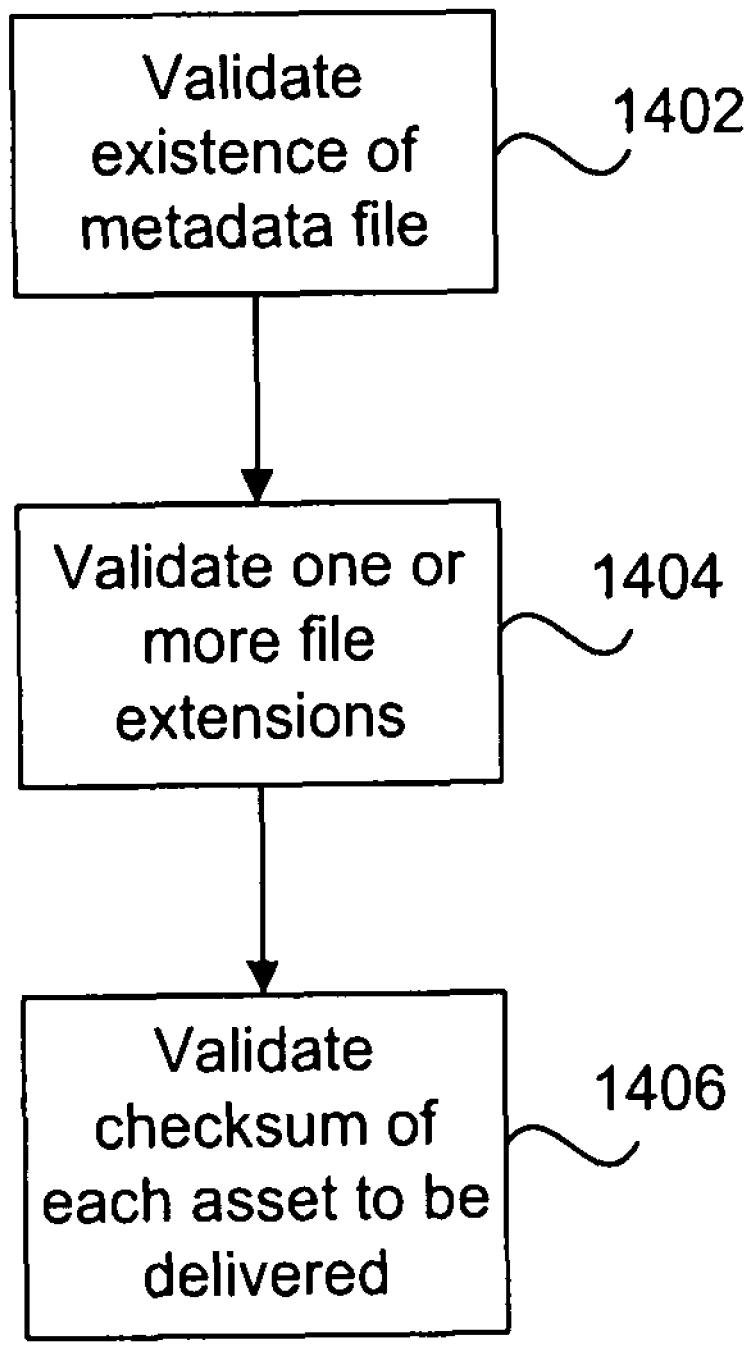
FIG. 14 is a process flow diagram illustrating a method of validating metadata by the Client as shown at 1214 of FIG. 12.

Before a client sends metadata or a package including metadata, the client can validate the metadata to ensure its validity. FIG. 14 is a process flow diagram illustrating a method of validating metadata by the Client as shown at 1214 of FIG. 12. Client can validate the existence of a metadata file including metadata content at 1402. Client can also validate the file extension of one or more of the data files identified in the metadata at 1404. In addition, client can validate the checksum for each asset being delivered at 1406. More particularly, the metadata content can include a checksum for each data file to be delivered. Thus, client can calculate a checksum for a data file to ensure that the calculated checksum matches the checksum in the metadata content at 1406. In one embodiment, MD5 checksums can be used to ensure that the digital assets are not modified during the submission process. In other words, digital assets that are submitted should match the checksums that have been provided in the metadata. Assuming that the metadata has been validated by the client and/or the media distribution system, the media content data can be successfully uploaded. The media content data can then be used to generate digital media assets for distribution.

The user interface for the Transporter can support various commands that can be entered by a client (i.e., user). Alternatively, a menu or other user interface can enable the user to indicate various preferences. In other words, user input can be provided in association with package submission.

In one embodiment, the user can specify a Transporter mode. In one embodiment, the Transporter mode can be provider, verify, or upload. Using provider mode, it is possible for client to obtain a list of providers for which the client has permission to deliver content. This mode can be used to verify if client has permission to deliver content for a specific provider, as well as to obtain a "shortname" that can be used when uploading content for the provider. Using verify mode, it is possible to validate a package against specifications (e.g., metadata specifications) such as those set forth above prior to submitting a package. It is also possible in verify mode to validate data files that are included in the package prior to submitting the package. Upload mode can be used to upload media content data (e.g., provided in a package). Client can specify either a source directory containing package(s) to be uploaded or a filename for a single package to be uploaded.

Client can also choose to log output information resulting from uploading package(s). Logging preferences can be indicated through the use of various commands or menu selections, for example. For instance, client can specify a directory or filename to which output information is to be logged. More specifically, client can specify a directory or filename to which successfully uploaded package and/or file information is to be logged. In some embodiments, it is possible to specify a log level indicating an amount of information and/or level of detail of information to be logged. For instance, client may wish to receive all error messages. Alternatively, the client may wish to receive critical level log messages, informational log level messages, and/or detailed log level messages.

It is also possible for the user to specify a directory to which successfully uploaded and/or unsuccessfully unloaded packages are to be moved after the Transporter completes the upload process. Similarly, it is also possible for the user to specify a directory to which validated packages are to be moved before the client uploads the packages. Either of these options can be specified via a command or other user interface (e.g., menu).

It is also possible to remove (e.g., delete) successfully uploaded packages from the source directory after Transporter completes the upload process. This preference can be specified in a command or via a user interface such as a menu. Therefore, packages that have not successfully uploaded can remain in their original location.

The various aspects, features, embodiments or implementations of the invention described above can be used alone or in various combinations. The media items can pertain to podcast episodes, audio items (e.g., audio files or songs, such as for music or audiobooks), video items (e.g., video files, television episodes or movies), or image items (e.g., photos).

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of the invention is that media items are able to be generated (e.g., encoded) from a subset of media data provided in a plurality of data files. Another advantage of the invention is that information supporting the generation of media items can be uploaded in a package format that identifies the plurality of data files. For instance, the package can include a metadata file that identifies the data files, as well as define the manner in which the data files can be used to generate a digital media item. Still another advantage is the ability to prevent media items from being uploaded if the corresponding metadata or package is not valid.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of submitting metadata content to a media content distribution system, comprising:

generating, at a client computing device associated with a content provider, a package including one or more metadata files and a plurality of data files, each of the plurality of data files including media content, and each of the metadata files including metadata content;

determining, at the client computing device, whether the package is a valid package by at least evaluating whether the metadata content conforms to a metadata specification;

submitting metadata content from the content provider to the media content distribution system if it is determined that the package is a valid package, the metadata content being descriptive of the plurality of data files;

determining, at the media content distribution system, whether the metadata content is valid prior to submitting the media content to the media content distribution system by evaluating whether the metadata content conforms to a metadata specification;

preventing the content provider from uploading media content associated with the metadata content if it is determined that the metadata content is invalid;

receiving at the client computing device a list of expected files from the media content distribution system;

determining, at the client computing device, whether the package contains each of the expected files in the list of expected files; and submitting the package to the media content distribution system if it is determined that metadata content is valid and the package contains each of the expected files.

2. The method as recited in claim 1, further comprising:
validating existence of a metadata file including the metadata content.

3. The method as recited in claim 1, wherein the metadata content includes a checksum for each of the plurality of data files.

4. The method as recited in claim 3, wherein evaluating whether the metadata content conforms to a metadata specification comprises:
   calculating a checksum for one of the plurality of data files; and
   determining whether the calculated checksum matches the checksum in the metadata content.

5. The method as recited in claim 1, wherein determining whether the metadata content is valid comprises: checking an extension of one or more of the plurality of data files.

6. An apparatus for submitting metadata content to a media content distribution system, comprising a processor and a memory, at least one of the processor or the memory being configured for:
   generating a package including one or more metadata files and a plurality of data files, each of the plurality of data files including media content, and each of the metadata files including metadata content;
   submitting metadata content from the content provider to the media content distribution system if it is determined that the package is a valid package, the metadata content being descriptive of the plurality of data files;
   determining whether the metadata content is valid prior to submitting the media content to the media content distribution system by at least evaluating whether the metadata content conforms to a metadata specification;
   preventing the upload, to the media content distribution system, of media content associated with the metadata content if it is determined that the metadata content is invalid;
   receiving a list of expected files from the media content distribution system;
   determining whether the package contains each of the expected files in the list of expected files; and
   submitting the package to the media content distribution system if it is determined that metadata content is valid and the package contains each of the expected files.

7. The method as recited in claim 1, further comprising:
   moving, prior to submitting the package, the package to a directory if it is determined that the package is a valid package.

8. The method as recited in claim 1, further comprising:
   enabling a digital media file to be encoded using at least a portion of the media content in the plurality of data files according to the metadata content.

9. The apparatus as recited in claim 6, wherein the metadata content includes a checksum for each of the plurality of data files.

10. The apparatus as recited in claim 6, wherein the at least one of the processor or the memory is further configured for:
   calculating a checksum for one of the plurality of data files; and determining whether the calculated checksum matches the checksum in the metadata content.

11. The apparatus as recited in claim 6, wherein the at least one of the processor or the memory is further configured for:
   checking an extension of one or more of the plurality of data files to determine whether the metadata content is valid.

12. The apparatus as recited in claim 6, wherein the at least one of the processor or the memory is further configured for:
   enabling a digital media file to be encoded at the media content distribution system using at least portion of the media content in the plurality of data files according to the metadata content subsequent to the submitting.

13. A program storage device readable by a machine tangibly embodying a set of program instructions executable by the machine to perform a method for submitting metadata content to a media content distribution system, the method comprising:
   generating, at a client computing device associated with a content provider, a package including one or more metadata files and a plurality of data files, each of the plurality of data files including media content, and each of the metadata files including metadata content, the metadata content being descriptive of the media content data files;
   determining, at the client computing device, whether the package is a valid package by evaluating whether the metadata content conforms to a metadata specification and the metadata content accurately describes the media content;
   submitting metadata content from the content provider to the media content distribution system if it is determined that the package is a valid package,
   determining, at the media content distribution system, whether the metadata content is valid prior to submitting the media content to the media content distribution system by evaluating whether the metadata content conforms to a metadata specification using the-metadata content;
   preventing the content provider from uploading media content associated with the metadata content if it is determined that the metadata content is invalid;
   receiving at the client computing device a list of expected files from the media content distribution system;
   determining, at the client computing device, whether the package contains each of the expected files in the list of expected files; and
   submitting the package to the media content distribution system if it is determined that metadata content is valid and the package contains each of the expected files.

14. The program storage device of claim 13, comprising:
   validating existence of a metadata file including the metadata content.

15. The program storage device of claim 13, wherein the metadata content includes a checksum for each of the plurality of data files.

16. The program storage device of claim 15, wherein evaluating whether the metadata content conforms to a metadata specification comprises:
   calculating a checksum for one of the plurality of data files; and
   determining whether the calculated checksum matches the checksum in the metadata content.

17. The program storage device of claim 13, wherein determining whether the metadata content is valid comprises:
   checking an extension of one or more of the plurality of data files.

18. The program storage device of claim 13, further comprising:
   moving, prior to submitting the package, the package to a directory if it is determined that the package is a valid package.

19. The program storage device of claim 13, further comprising enabling a digital media file to be encoded using at least a portion of the media content in the plurality of data files according to the metadata content.

* * * * *

UNITED STATES PATENT AND TRADEMARK OFFICE
CERTIFICATE OF CORRECTION

PATENT NO. : 7,962,634 B2  
APPLICATION NO. : 11/712304  
DATED : June 14, 2011  
INVENTOR(S) : Ricardo Cortes et al.

Page 1 of 1

It is certified that error appears in the above-identified patent and that said Letters Patent is hereby corrected as shown below:

On the title page, under item 12 which specifies the type of document, the last name of the first inventor is misspelled as "Cortos" and should be changed to --Cortes--.

On the title page, under item 75 which provides the listing of inventors, the last name of the first inventor is misspelled as "Cortos" and should be changed to --Cortes--.

Signed and Sealed this  
Twenty-fourth Day of December, 2013

Margaret A. Focarino  
*Commissioner for Patents of the United States Patent and Trademark Office*